United States Patent
Siddiqui et al.

(10) Patent No.: US 10,555,145 B1
(45) Date of Patent: Feb. 4, 2020

(54) LEARNED CONFIGURATION OF MODIFICATION POLICIES FOR PROGRAM EXECUTION CAPACITY

(75) Inventors: Muhammad Ali Siddiqui, Snoqualmie, WA (US); Gregory S. Kang, Seattle, WA (US); Srikant Meka, Bellevue, WA (US); Rishikesan Rangarajan, Bellevue, WA (US); Sanjeev K. Verma, Seattle, WA (US); Kendra A. Yourtee, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 2160 days.

(21) Appl. No.: 13/489,278

(22) Filed: Jun. 5, 2012

(51) Int. Cl.
*H04W 4/50* (2018.01)
*H04L 12/24* (2006.01)

(52) U.S. Cl.
CPC ........... *H04W 4/50* (2018.02); *H04L 41/5054* (2013.01)

(58) Field of Classification Search
CPC ........ G06F 9/50; G06F 19/321; G06F 19/327; G06F 2209/483; G06F 2209/504; G06F 9/4881; G06F 9/4887; G06F 9/5038; G06F 2209/5019; G06F 2209/503; G06F 11/1461; G06F 8/65; G06F 3/0605; G06F 2206/1012; G06F 11/3442; G06F 2201/81; G06F 2201/88; G06F 2209/501; G06F 11/3051; G06F 11/3089; G06F 11/3409;

(Continued)

(56) References Cited

U.S. PATENT DOCUMENTS

| | | | |
|---|---|---|---|
| 5,408,587 A | 4/1995 | Maier et al. | |
| 6,734,878 B1 * | 5/2004 | DeLuca | H04L 41/0806 715/735 |

(Continued)

OTHER PUBLICATIONS

Metz, C. "Amazon Teaches Cloud Self-Growth Trick," May 18, 2009, retrieved on Aug. 11, 2009, from http://www.theregister.co.uk/2009/05/18/amazon_cloud_monitoring_and_fluffing_tools/print.html, 3 pages.

(Continued)

*Primary Examiner* — Jeffrey Nickerson
*Assistant Examiner* — Jonathan A Sparks
(74) *Attorney, Agent, or Firm* — Robert C. Kowert; Kowert, Hood, Munyon, Rankin & Goetzel, P.C.

(57) ABSTRACT

Techniques are described for managing program execution capacity used to execute software programs, such as for a group of computing nodes in use executing one or more programs for a user. Dynamic modifications to the program execution capacity of the group may include adding or removing computing nodes, such as based on automated determinations that previously specified criteria are currently satisfied. The described techniques further include tracking information about changes that occur in one or more capacity utilization metrics of interest in response to dynamic modifications to the program execution capacity of the group, and then using such learned responses to determine a customized capacity modification policy that is configured for the actual operation of the software program(s) for the user. In some situations, the techniques are used in conjunction with a fee-based program execution service that executes multiple programs on behalf of multiple users of the service.

29 Claims, 7 Drawing Sheets

(58) Field of Classification Search
CPC ............ G06F 11/3433; G06F 11/3447; G06F 17/5009; G06F 2201/86; G06F 2212/502; G06F 9/5027
USPC ........ 709/223, 224, 225, 226, 200, 228, 201
See application file for complete search history.

(56) References Cited

U.S. PATENT DOCUMENTS

| | | | |
|---|---|---|---|
| 6,779,030 B1 | 8/2004 | Dugan et al. | |
| 6,836,785 B1* | 12/2004 | Bakshi | H04L 47/28 709/203 |
| 7,209,964 B2 | 4/2007 | Dugan et al. | |
| 7,590,746 B2 | 9/2009 | Slater et al. | |
| 7,593,404 B1* | 9/2009 | Droux et al. | 370/392 |
| 7,792,944 B2 | 9/2010 | DeSantis et al. | |
| 7,822,862 B2 | 10/2010 | Slater et al. | |
| 7,937,438 B1 | 5/2011 | Miller et al. | |
| 7,991,906 B2 | 8/2011 | Ng et al. | |
| 8,024,736 B1 | 9/2011 | Graupner et al. | |
| 8,190,682 B2 | 5/2012 | Paterson-Jones et al. | |
| 8,499,066 B1* | 7/2013 | Zhang et al. | 709/223 |
| 8,782,655 B2* | 7/2014 | Blanding et al. | 718/104 |
| 2002/0002613 A1 | 1/2002 | Freeman et al. | |
| 2003/0028642 A1* | 2/2003 | Agarwal et al. | 709/226 |
| 2003/0115244 A1 | 6/2003 | Molloy et al. | |
| 2003/0210672 A1* | 11/2003 | Cromer | H04L 47/10 370/338 |
| 2003/0212734 A1 | 11/2003 | Stewart | |
| 2004/0010544 A1 | 1/2004 | Slater et al. | |
| 2004/0205108 A1 | 10/2004 | Tanaka | |
| 2004/0267897 A1* | 12/2004 | Hill et al. | 709/217 |
| 2005/0132041 A1* | 6/2005 | Kundu | 709/224 |
| 2005/0144234 A1 | 6/2005 | Tanaka et al. | |
| 2005/0228856 A1* | 10/2005 | Swildens | G06F 9/50 709/200 |
| 2006/0173857 A1 | 8/2006 | Jackson | |
| 2006/0179106 A1* | 8/2006 | Turner et al. | 709/201 |
| 2006/0179143 A1 | 8/2006 | Walker et al. | |
| 2007/0083863 A1* | 4/2007 | Bril | G06F 9/4881 718/100 |
| 2007/0150571 A1 | 6/2007 | Haga et al. | |
| 2007/0168919 A1* | 7/2007 | Henseler et al. | 717/101 |
| 2007/0240160 A1 | 10/2007 | Paterson-Jones et al. | |
| 2008/0059557 A1 | 3/2008 | DeSantis et al. | |
| 2008/0059972 A1* | 3/2008 | Ding | G06F 9/505 718/105 |
| 2008/0091806 A1* | 4/2008 | Shen et al. | 709/223 |
| 2008/0104452 A1* | 5/2008 | Archer et al. | 714/47 |
| 2008/0172673 A1* | 7/2008 | Naik | G06F 9/505 718/104 |
| 2009/0012641 A1 | 1/2009 | Ruggieri | |
| 2009/0016220 A1 | 1/2009 | Uysal et al. | |
| 2009/0157737 A1 | 6/2009 | Konik et al. | |
| 2009/0157870 A1* | 6/2009 | Nakadai | G06F 9/505 709/224 |
| 2009/0276771 A1 | 11/2009 | Nickolov et al. | |
| 2011/0078411 A1* | 3/2011 | Maclinovsky | G06Q 10/06 712/30 |
| 2011/0078705 A1 | 3/2011 | Maclinovsky et al. | |
| 2011/0153684 A1* | 6/2011 | Yung | 707/805 |
| 2011/0173637 A1 | 7/2011 | Brandwine et al. | |
| 2012/0072762 A1 | 3/2012 | Atchison et al. | |
| 2012/0330711 A1* | 12/2012 | Jain et al. | 705/7.23 |
| 2013/0060933 A1* | 3/2013 | Tung et al. | 709/224 |

OTHER PUBLICATIONS

Willis, John M., "Tools to Use in the Cloud (Revised)," Feb. 4, 2009, retrieved on Aug. 11, 2009, from http://www.johnmwillis.com/other/tools-to-use-in-the-cloud/, 8 pages.
Work, H., "Scalr: The Auto-Scaling Open-Source Amazon EC2 Effort," Apr. 3, 2008, retrieved on Aug. 11, 2009, from http://www.techcrunch.com/2008/04/03/scalr-the-auto-scaling-open-source-amazon-ec2-effort/, 1 page.
Amazon Web Services, "Amazon Elastic Compute Cloud (Amazon EC2)," retrieved on Aug. 11, 2009, from http://aws.amazon.com/ec2/, 7 pages.
Amazon Web Services, "Announcement: Introducing Monitoring, Auto Scaling and Elastic Load Balancing for Amazon EC2," May 17, 2009, retrieved on Jul. 6, 2009, from http://developer.amazonwebservices.com/connect/ann.jspa?annID=446,1 page.
Amazon Web Services, "Auto Scaling," retrieved on Aug. 11, 2009, from http://aws.amazon.com/autoscaling 2 pages.
O'Reilly Conferences, "Pool Party: Autoscaling on EC2," May 30, 2008, retrieved on Aug. 11, 2009, from http://en.oreilly.com/rails2008/public/schedule/detail/4528, 4 pages.
Rackspace Cloud, "Cloud Sites and Cloud Computing FAQ from Rackspace Cloud Hosting," retrieved on Aug. 11, 2009, from http://www.rackspacecloud.com/cloud_hosting_products/sites/faq, 9 pages.
Rackspace Cloud, "Cloud Sites—The Power of Cloud Computing & Cloud Hosting by Rackspace," retrieved on Aug. 11, 2009, from http://www.rackspacecloud.com/cloud_hosting_products/sites, 4 pages.
Right Scale, "Scalable Website," retrieved on Aug. 11, 2009, from http://www.rightscale.com/products/cloud-computing-uses/scalable-website.php?clickTag=Scalab . . . , 6 pages.
Wikipedia, "Tivoli Software," retrieved Aug. 11, 2009, from http://en.wikipedia.org/wiki/Tivoli_Software, 2 pages.
WeoCEO, retrieved Aug. 11, 2009, from http://weoceo.weogeo.com/, 1 page.
3tera, "Cloud Computing Without Compromise," retrieved Aug. 11, 2009, from http://www.3tera.com/Cloud-computing/faq.php, 2 pages.
3tera, "Cloudware Open Architecture for Cloud Computing," retrieved Aug. 11, 2009, from http://www.3tera.com/Cloud-computing/, 2 pages.
Amazon Web Services, "Auto Scaling," retrieved on Jul. 21, 2010, from http://aws.amazon.com/autoscaling, 2 pages.
Amazon Web Services Blog, "New Features for Amazon EC2: Elastic Load Balancing, Auto Scaling, and Amazon CloudWatch," retrieved on Jul. 21, 2010, from http://aws.typepad.com/aws/2009/05/new-aws-load-balancing-automatic-scaling-and-clo . . . , 3 pages.

* cited by examiner

EXAMPLE TRIGGERS

250a — Trigger TR-1 – if aggregate CPU utilization >= 55%, then increase computing node quantity by 5%
250b — Trigger TR-2 – if aggregate CPU utilization >= 60%, then increase computing node quantity by additional 5%
250 — Trigger TR-3 – if aggregate CPU utilization <= 45%, then decrease computing node quantity by 5%
250c — ...
250d — Trigger TR-N – if aggregate bandwidth utilization >= 55%, then increase computing node quantity by 5%

Example Computing Node Group Events Database

| Event ID | Group ID | Event Type | Event Source | Time | Time Period |
|---|---|---|---|---|---|
| E01 | Group1 | initiate node replacement | system initiated | T07 | first |
| E02 | Group1 | increase desired quantity by 3 | trigger TR-1 | T15 | second |
| E03 | Group1 | increase desired quantity by 3 | trigger TR-2 | T16 | second |
| E04 | Group1 | decrease desired quantity by 3 | trigger TR-3 | T27 | third |
| ... | | | | | ... |

*Fig. 2B*

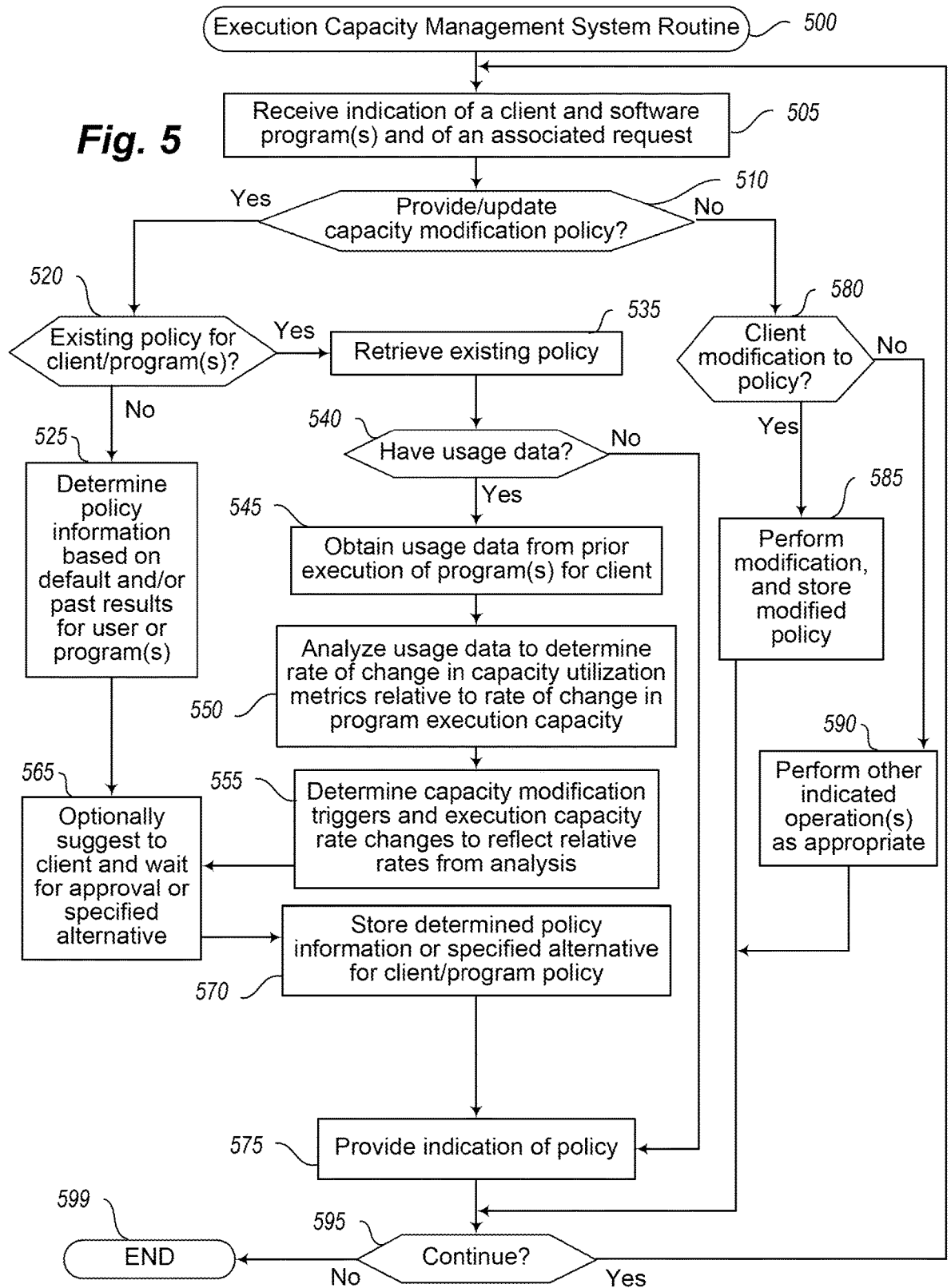

LEARNED CONFIGURATION OF MODIFICATION POLICIES FOR PROGRAM EXECUTION CAPACITY

BACKGROUND

Many companies and other organizations operate computer networks that interconnect numerous computing systems to support their operations, such as with the computing systems being alternatively co-located (e.g., as part of a private local area network at a site of the organization, as part of a single data center, etc.) or instead located in multiple distinct geographical locations (e.g., connected via one or more other private or public intermediate networks). Such groups of interconnected computing systems are increasingly useful for various reasons, including to support increasingly large computing tasks that may be distributed across multiple computing systems. However, the provisioning, administering, and managing of computing resources to support such distributed computing tasks has become increasingly complicated.

BRIEF DESCRIPTION OF THE DRAWINGS

FIGS. 2A-2C illustrate examples of managing program execution capacity of a set or other group of multiple computing nodes for a user, such as to automatically learn a policy to use for modifying program execution capacity used by a client for executing one or more software programs.

FIG. 5 illustrates a flow diagram of an example embodiment of an Execution Capacity Management System routine.

DETAILED DESCRIPTION

Figure 1:
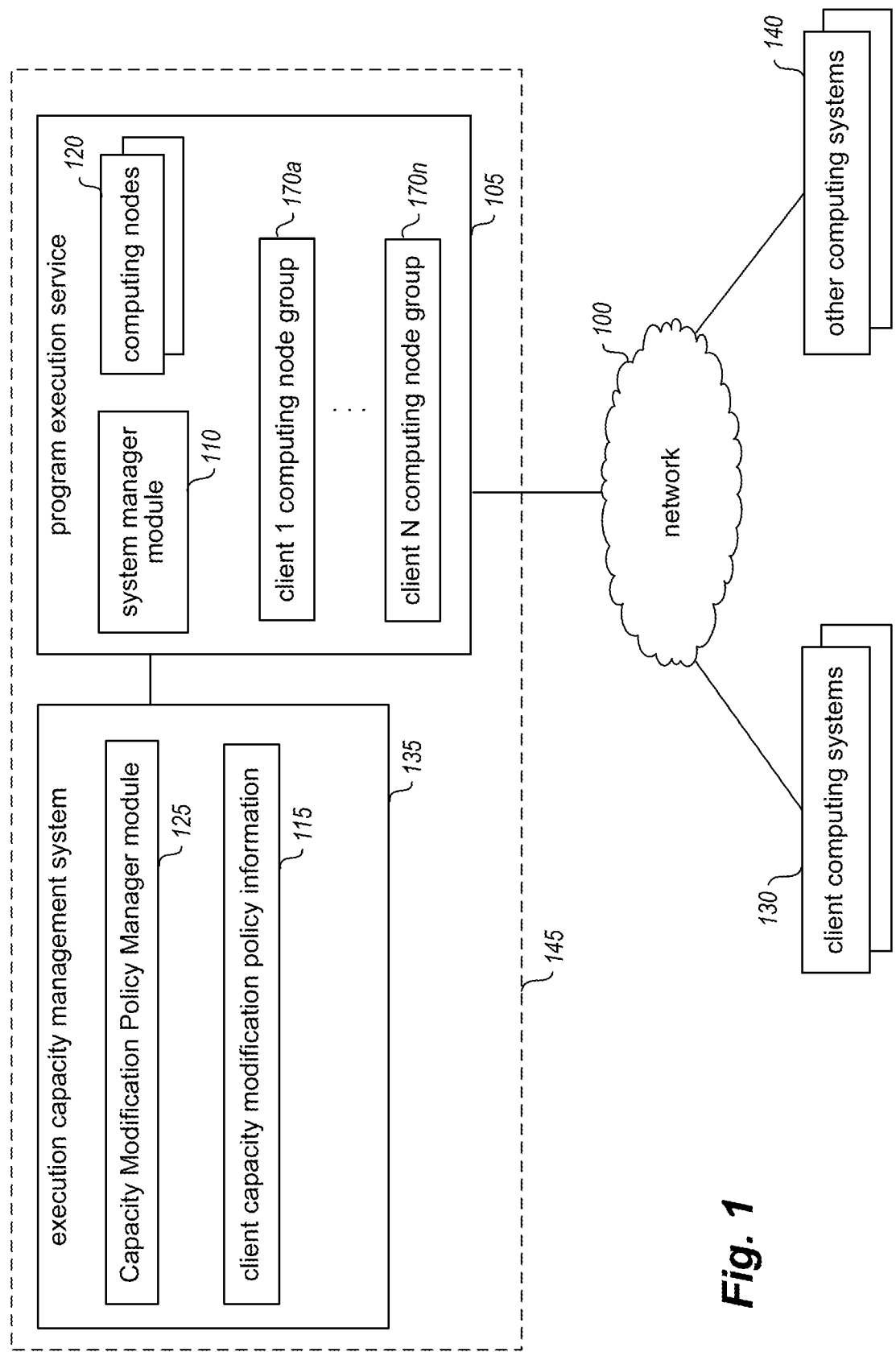
FIG. 1 is a network diagram illustrating an example embodiment of a system that manages use of program execution capacity for clients of a program execution service.

Techniques are described for managing execution-related capacity used by one or more clients, such as program execution capacity used to execute software programs for one or more users. In at least some embodiments, the execution-related capacity being managed includes a set or other group of one or more computing nodes that are provided for use in executing one or more software programs on behalf of a user, with the group of computing nodes being dynamically modifiable while in use in order to manage an amount of execution-related capacity that is available to the user from the computing nodes of the group. The modifications to the group of computing nodes associated with the user may have various forms in various embodiments (e.g., to modify a quantity of computing nodes in the group, such as by dynamically adding and/or removing computing nodes), and may be initiated in various manners in various embodiments. For example, in at least some embodiments, a capacity modification policy may be defined and used for the user to automatically modify the program execution capacity provided by the computing nodes of the group—the capacity modification policy may, for example, specify one or more criteria that may trigger an automated modification to the program execution capacity, such as to add program execution capacity if a specified capacity utilization metric (e.g., average CPU percentage utilization) reaches a measured value above a specified threshold.

In addition, in at least some embodiments, the dynamic modification of the execution-related capacity is automatically monitored by an embodiment of an automated execution capacity management system, such as an execution capacity management system that is part of or otherwise operates in conjunction with a program execution service ("PES") that manages the execution of multiple programs on behalf of multiple customers or other users of the service. In particular, the execution capacity management system may monitor modifications that are dynamically made to the program execution capacity of a computing node set or other group, and then measure corresponding changes in one or more capacity utilization metrics of interest. For example, if the program execution capacity of the computing node group is increased by 10% (e.g., by increasing the quantity of computing nodes in the computing node group by 10%), then a 10% reduction may be naively expected in a first capacity utilization metric of interest (e.g., average CPU percentage utilization), and/or a 10% increase may be naively expected in a second capacity utilization metric of interest (e.g., average number of jobs completed by the computing node group per unit of time). However, the actual increase and/or reduction in the capacity utilization metric(s) may vary in one or more manners and for one or more reasons from a purely linear proportional response to the modification in program execution capacity, as discussed in greater detail below, and the execution capacity management system tracks the actual changes that occur in the capacity utilization metrics of interest relative to the modification in program execution capacity.

The execution capacity management system may further use such tracked information from the monitored performance to automatically modify the capacity modification policy being used for the current user and/or software program(s), such that the modified capacity modification policy will be configured for and customized to the actual operation of the software program(s) for the user. Thus, for example, if a 10% reduction in a particular capacity utilization metric is desired for a particular computing node set or other group, the customized modified capacity modification policy may specify an actual amount of program execution capacity to modify for that particular computing node group (e.g., a fixed number, such as a 15% increase in program execution capacity; a formula or other representation of changing values in program execution capacity to achieve a specified type of response in the particular capacity utilization metric, such as in a manner that varies with a current value of the program execution capacity and/or the particular capacity utilization metric, etc.). In this manner, by using a capacity modification policy that is configured for and customized to the actual operation of the software program(s) for the user, the occurrence of adverse events may be minimized, in which the operating characteristics of the software program execution are outside a preferred state (e.g., when the values for one or more capacity utilization metrics of interest are above or below specified thresholds). Additional details are included below related to the dynamic modification of execution-related capacity modification policies for computing node groups based on learned responses of those computing node groups to modifications in program execution capacity.

In some embodiments discussed below, the execution-related capacity being managed includes program execution capacity used to execute software programs for one or more users. However, it will be appreciated that the described techniques may in at least some embodiments be used to manage resource usage capacity that includes access to various types of computing-related resources or other hardware resources, including in some situations for purposes other than execution of one or more software programs. A non-exclusive list of examples of types of hardware resources that may be managed for use by multiple users in accordance with the described techniques include the following: persistent data storage capabilities (e.g., on non-volatile memory devices, such as hard disk drives); temporary data storage capabilities (e.g., on volatile memory, such as RAM); message queuing and/or passing capabilities; other types of communication capabilities (e.g., network sockets, virtual communication circuits, etc.); database management capabilities; dedicated bandwidth or other network-related resources; input device capabilities; output device capabilities; CPU cycles or other instruction execution capabilities; multiple devices that provide a common type of functionality; multiple devices from a common manufacturer or other source; multiple devices that are grouped together by the execution capacity management system (e.g., in a common pool); etc.

When managing program execution capacity used to execute one or more software programs for a user, the dynamic modifications that are performed to a set or other group of computing nodes that is in use executing the one or more programs may have various forms and may be initiated in various manners in various embodiments. As one example, the program execution capacity of the group of computing nodes may be measured at least in part by the quantity of computing nodes that are part of the group, and may be modified by changing the computing node quantity of the group (e.g., to increase the program execution capacity by increasing the computing node quantity, and to decrease the program execution capacity by decreasing the computing node quantity). In addition, a PES or other system that is managing the computing nodes of a group that is in use executing one or more programs for a user may automatically determine to make dynamic program execution capacity modifications for the computing node group in various manners. For example, in at least some embodiments and situations, requests to make dynamic program execution capacity modifications for the computing node group may be based at least in part on one or more of automated determinations that triggers previously defined by the user or by the PES are currently satisfied, while in other embodiments and situations, the user may dynamically supply specified modification instructions. Such defined triggers or other specified information to use in determining whether, when and how to modify execution capacity for a computing node group, user and/or software program(s) are referred to generally herein as a defined capacity modification policy. In addition to such defined triggers and/or other specified information, capacity modification policies may also optionally include one or more other types of specified criteria that are used to limit or control dynamic modifications made to program execution capacity. Such other criteria may be specified by, for example, the user, the program execution service, the execution capacity management system, etc., and may have various forms (e.g., criteria related to a threshold percentage or absolute change in the program execution capacity, to a threshold percentage or absolute change or absolute amount in fees charged by a program execution service to the user to provide requested program execution capacity, to a current amount owed or other balance of the user with respect to the program execution service and/or execution capacity management system, etc.). Similar techniques apply to managing hardware resources in other situations, and additional details are included below related to the dynamic modification of program execution capacity available from a group of computing nodes.

FIG. 1 is a network diagram that illustrates an example of a program execution service 105 that manages computing nodes that are available for use in providing program execution capacity to execute programs for multiple users, and that illustrates an example of an execution capacity management system 135 that automatically modifies capacity modification policy information specific to particular users of the program execution service 105 in accordance with learned feedback from actual prior modifications to program execution capacity. In the illustrated embodiment, the program execution service 105 and the execution capacity management system 135 are integrated together into a single network-accessible service 145, but in other embodiments may have other forms (e.g., being separate systems operated by separate entities, being in the form of a single system that includes at least some of the described functionality of both the program execution service and the execution capacity modification system, etc.).

In addition, for illustrative purposes, some examples and embodiments are described below in which specific types of program execution capability are provided, managed and dynamically governed in specific manners. Furthermore, in some of the examples and embodiments described below, the program execution capacity that is provided by a set or other group of computing nodes may be measured in particular manners (e.g., based on a quantity of the computing nodes), may be controlled by associated users in various manners (e.g., based on the use of predefined triggers and/or dynamically specified instructions), may be automatically governed in particular manners (e.g., based on upper and lower bounds allowed for program execution capacity amounts at each of one or more times), etc. These examples are provided for illustrative purposes and are simplified for the sake of brevity, and it will be appreciated that the inventive techniques may be used in a wide variety of other situations, only some of which are described below.

In the example of FIG. 1, various users (not shown) are using various client computing systems 130 to interact over a network 100 with the PES 105 as clients of the PES, which is provided in this example by an entity (not shown) who also provides the execution capacity management system 135 in conjunction with the PES 105. The various users may or may not be aware of the operations that are performed by the execution capacity management system 135 and/or of the existence of the execution capacity management system 135. In this example, at least some of the functionality of the PES is provided by a system manager module 110 of the PES 105, and other functionality may optionally be provided by other modules (not shown) of the PES 105. The module 110 may, for example, assist particular users in configuring groups 170 of computing nodes to be used to execute programs for the users, including specifying initial desired computing node quantities for the groups and specifying triggers for use in later automatically making dynamic modifications to the computing node quantities. In this example, the PES makes various computing nodes 120 available for executing programs of the users, although in other embodiments at least some of the computing nodes used for at least some of the groups may be provided in other manners (e.g., made available by the users and/or by third-parties, such as external computing systems 140, but managed by the PES). In addition, one or more modules of the PES may assist in continuously or repeatedly monitoring computing node groups that are in use, and optionally attempting to replace any computing nodes that fail or otherwise become unavailable, so as to maintain program execution capacity at previously determined levels.

As the PES 105 provides groups 170 of computing nodes for use by various users, the PES 105 interacts with the ECMS 135 in this example to provide additional functionality to benefit the users, such as in response to fees charged to the users by the PES 105 and/or the ECMS 135. In particular, the illustrated embodiment of the ECMS 135 stores various client capacity modification policy information 115 for one or more users who are clients of the PES (although in other embodiments the PES may store such policy information), and further includes a Capacity Modification Policy Manager module 125. The module 125 operates to monitor performance and behavior of computing node groups for the one or more users (or receives information about such monitored performance from the PES or other external source), and learns how performance of a particular such computing node group responds to changes to program execution capacity for the group. If a particular such computing node group has one or more adverse events, such as based on values of one or more capacity utilization metrics that are too high or too low (e.g., above or below specified thresholds for any time, or for at least a minimum amount of time), the module 125 may further use the information about the learned performance of that particular computing node group in order to modify the capacity modification policy in use for that particular computing node group, such as to eliminate or minimize future adverse events that occur when using the modified capacity modification policy. Thus, the operation of the module 125 may include various interactions with the PES 105, such as to obtain performance information, provide modified capacity modification policy information, etc. Additional details are included elsewhere about the determination of a modified capacity modification policy based on learned feedback information from actual operation of a computing node group.

The network 100 may, for example, be a publicly accessible network of linked networks, possibly operated by various distinct parties, such as the Internet. In other embodiments, the network 100 may be a private network, such as, for example, a corporate or university network that is wholly or partially inaccessible to non-privileged users. In still other embodiments, the network 100 may include one or more private networks with access to and/or from the Internet. In the illustrated embodiment, the modules 110, 115 and 125 may each include software instructions that execute on one or more computing systems (not shown). In addition, the modules and various computing nodes 120 may be provided in various manners, such as at a single data center or otherwise to use a group of co-located computing systems, or instead in a distributed manner using various computing systems in various distinct geographical locations.

In some embodiments, the illustrated computing nodes 120 may include multiple physical computing systems and/or multiple virtual machines that are hosted on one or more physical computing systems. Each of the computing nodes 120 has some amount of computing resources available for executing one or more programs, which provide a specific amount of program execution capacity, such as may be measured, for example, by a quantity of one or more such computing nodes and/or by a combination of one or more of processing capacity (e.g., number and/or size of processing units), memory capacity, storage capacity, network bandwidth capacity, etc. In some embodiments, the PES provider 105 may provide preconfigured computing nodes, with each preconfigured computing node having equivalent or otherwise similar amounts of resources available for executing programs on behalf of users, while in other embodiments, the PES provider 105 may provide a selection of various different computing nodes from which a user may choose for executing programs on behalf of the user, such as with each selection having varying amounts and/or types of computing resources (e.g., size, speed and/or type of processing units; number of processing units; amount of memory and/or storage; platform configuration, such as 32-bit or 64-bit; etc.).

In this illustrated embodiment, the program execution service provides functionality for managing groups 170 of one or more computing nodes 120 for each of multiple users. As discussed in greater detail elsewhere, the various users may interact with the module 110 to specify requests to initiate use of groups of computing nodes for execution of programs on behalf of the users. In various embodiments, such resources may be specified at the time of a request for execution of one or more programs on a group of computing nodes on behalf of a user and/or at one or more other times, such as when a user initially registers and/or subscribes to use services of the PES. In some embodiments, the module 110 may provide subscription and/or registration services to one or more users, such that users may specify information related to one or more programs to execute on behalf of a user (e.g., programs, source code, addressable locations of one or more programs, etc.), account information (e.g., user name, billing information, etc.), terms of use, etc. In some embodiments, after a user interacts with the module 110 to subscribe and/or register for services, the user may be issued one or more identifiers (e.g., keys, tokens, user names, etc.) that are associated with the user and are to be used in conjunction with executing programs on behalf of the user. In other embodiments, a module other than the module 110, not shown, may be provided to perform various operations related to subscription and/or registration services of a PES. While the user interacts directly in these manners with the PES 105 rather than the ECMS 135, in other embodiments the user may similarly interact directly with the ECMS 135 to perform some or all some activities, whether instead of or in addition to such interactions with the PES 105.

After a request is received from a user for use of one or more computing nodes, the module 110 may determine whether there are a sufficient number of computing nodes 120 with available resources for satisfying the request, and if so, the module 110 may initiate execution of one or more programs for the request on an appropriate amount of the computing nodes on behalf of the user, such as by forming a logical group 170 of computing nodes for temporary use by that user. In cases where a user schedules a request for future execution of one or more programs on a group of one or more computing nodes, the module 110 may attempt to immediately reserve an appropriate amount of computing nodes for executing the one or more programs at the one or more future times, and/or may delay the determination of which computing nodes to use for execution until a later time (e.g., such as when the one or more future times occur). In the illustrated embodiment, if the module 110 is unable to allocate computing nodes for a user request, the request may fail, such that the programs are not executed. In such cases, the user may resubmit a failed request for later execution. As previously noted, in some embodiments, a user may be charged various fees in association with use of the PES, such as based on a number of computing nodes used, a type of computing nodes used, a duration of time the computing nodes are used, particular operations that the computing nodes perform (e.g., data transfer and/or storage), etc.

After a group 170 of one or more computing nodes is provided for use in executing one or more programs on behalf of a user, the computing node group may be managed in various manners. For example, as previously noted, the modules 110 and/or 125 may monitor the computing nodes of the group, such as to determine performance characteristics of some or all of the computing nodes, including an actual computing node quantity or other measure of actual program execution capacity being provided by the computing nodes of the group. The actual program execution capacity of the group may change if, for example, one or more of the computing nodes fail or otherwise become unavailable, and in at least some embodiments, the PES 105 may perform various operations to maintain the program execution capacity of the computing node group in such situations (e.g., by initiating the addition of replacement computing nodes to the group in place of the unavailable computing nodes).

In addition, the module 110 may also assist in managing the computing node group in various manners. For example, as previously noted, the user associated with the group may have previously specified one or more quantity modification triggers that specify types of computing node quantity changes to be made to the group (or other types of capacity modification triggers with other specified types of capacity modifications) if various specified criteria are satisfied, or may otherwise have specified information for use in an initial capacity modification policy—in other embodiments, the PES may use an initial default capacity modification policy for some or all such users (e.g., for all users, for all users who do not specify a distinct initial policy, etc.). Furthermore, in at least some embodiments, the user associated with the group may dynamically specify changes to the operation of their associated computing node group at various times, including to change the quantity of the computing nodes of the group. Furthermore, the module 110 may perform other activities to track events and particular program execution capacity changes that occur with respect to particular computing node groups, and may store information about execution capacity amounts used by particular computing node groups for later use.

Although the foregoing example embodiment of FIG. 1 is described with respect to a PES that provides various types of functionality for various users, it will be appreciated that various other embodiments may exist. For example, in at least some embodiments, unused portions of a single one of the computing nodes 120 (e.g., unused processing unit clock cycles, unused portions of memory, etc.) may be made available for use by one or more users, such that one or more programs of a first user may be sharing resources of a single computing node with those of one or more other users. In addition, although some embodiments are described with respect to a program execution service and program execution capacity, it will be appreciated that the described techniques may be used to manage access to various other groups of computing nodes or other types of computing-related resources. A non-exclusive list of examples of other types of computing-related resources that may be managed for use by multiple users may include the following: persistent data storage capabilities (e.g., on non-volatile memory devices, such as hard disk drives); temporary data storage capabilities (e.g., on volatile memory, such as RAM); message queuing and/or passing capabilities; other types of communication capabilities (e.g., network sockets, virtual communication circuits, etc.); database management capabilities; dedicated bandwidth or other network-related resources; input device capabilities; output device capabilities; CPU cycles or other instruction execution capabilities; etc.

Figure 2A:
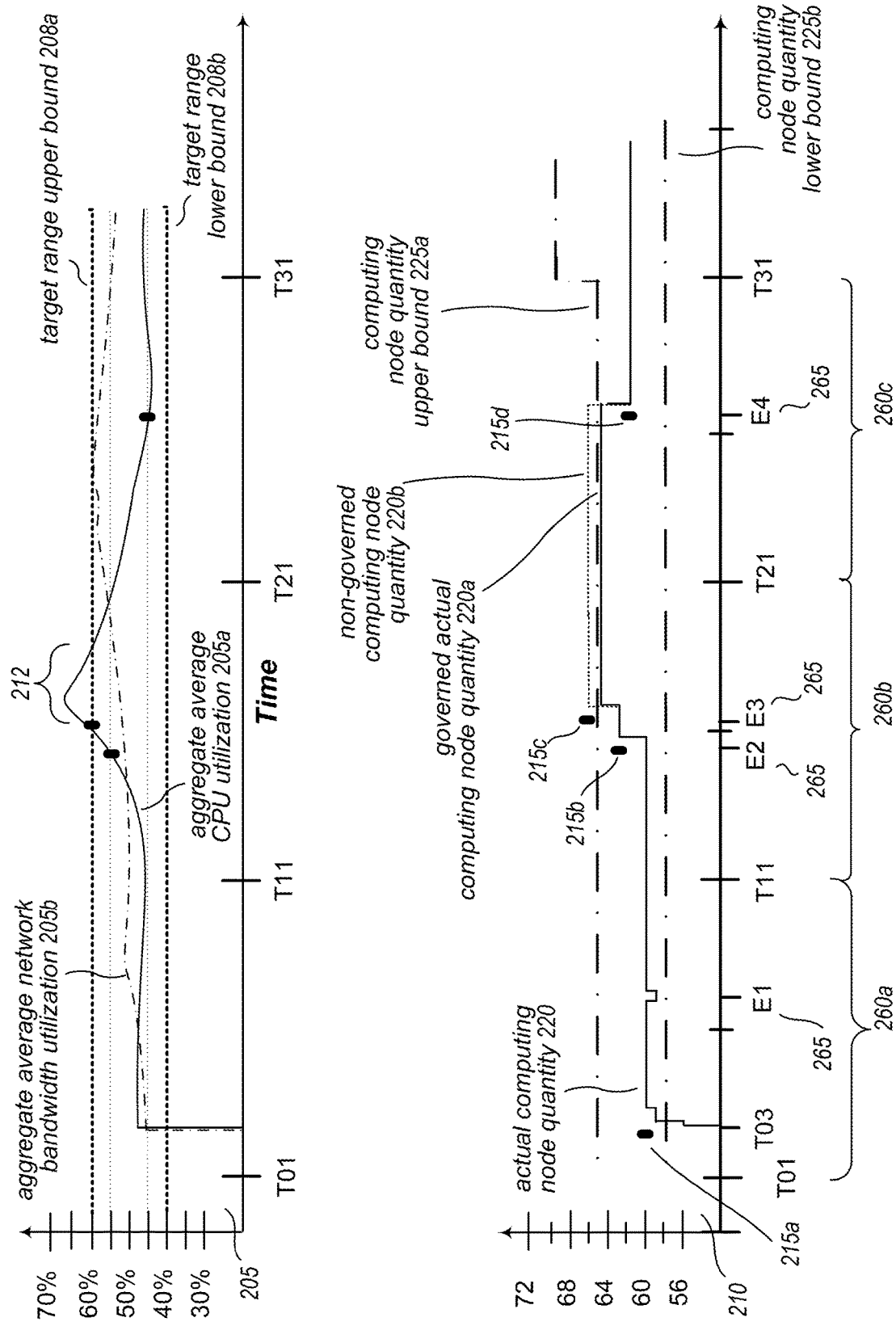
Figure 2C:
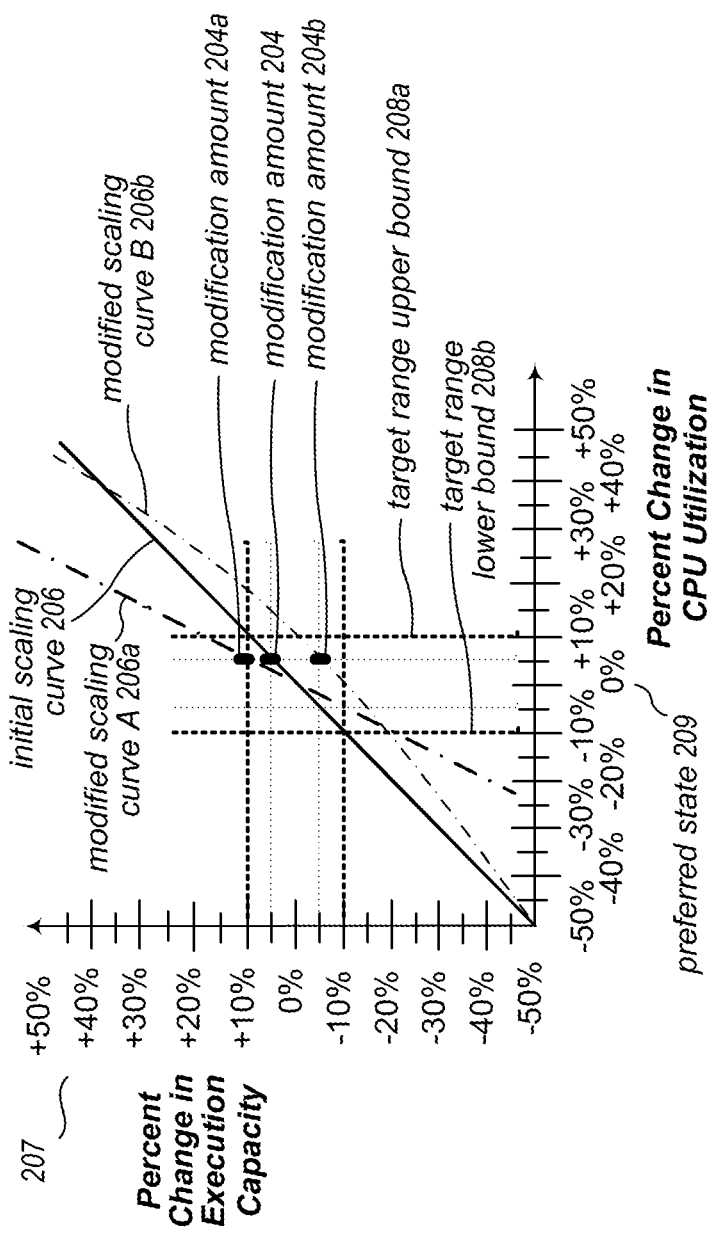

FIGS. 2A-2C illustrate examples of techniques for managing use of program execution capacity provided by a group of computing nodes executing one or more software programs for an example user, such as techniques that may be automatically performed by one or more modules of an example embodiment of an execution capacity management system. In particular, in the example of FIG. 2A, the program execution capacity is being provided for a particular example user (referred to as User UUU below, and not shown in FIG. 2A) by an example program execution service ("PES") that implements the execution capacity management system, with the user being a client of the PES. In this example, the provided program execution capacity of the computing node group is dynamically governed during initial execution of the software program(s) based on a defined initial capacity modification policy, and the capacity modification policy to be employed for this user for future execution of the software program(s) is automatically updated based on monitored results from the governed initial execution. The program execution capacity of the computing node group and the dynamic modifications to the program execution capacity are represented by quantities of computing nodes in this example, although program execution capacity may be measured and modified in other manners in other embodiments, as discussed in greater detail elsewhere.

In FIG. 2A, the example user has initiated the use of a group of multiple computing nodes to execute one or more copies of an indicated software program on behalf of the user, such as for the multiple computing nodes to each execute a copy and to serve as an alternative to handle requests received by a service that is provided by the executing program (e.g., in order to balance the computing load for the service across the multiple computing nodes of the group). As is illustrated in the timeline graph 210 of FIG. 2A, the user has requested that the computing node group be provided at approximately time T03, and has specified an initial computing node quantity 215*a* of 60 computing nodes for the group. While not illustrated here, the user may in some embodiments specify additional information regarding the computing node group, such as an amount of time for which the computing node group will be used, one or more types of computing nodes to use within the group, etc. In some situations, the user may further specify constraints on how the quantity of computing nodes for the group may be modified over time, while in other situations the execution capacity management system may automatically determine such constraints, or no constraints may be used. In this example, the user further designates a value of 58 as a minimum quantity of computing nodes to maintain for the computing node group, and a value of 65 as a maximum quantity of computing nodes to maintain for the computing node group—these values are represented on the graph 210 as a computing node quantity lower bound 225*b* and a computing node quantity upper bound 225*a*, respectively.

In order to determine whether and when to modify computing nodes within the group for the user, a defined capacity modification policy is also used in this example. In some embodiments and situations, some or all of the information in the defined capacity modification policy may initially be determined automatically by the execution capacity management system (e.g., by initially using default information, by using information previously determined for this user, etc.). In this example, information 250 of FIG. 2B indicates various system-defined default triggers for the computing node group. In addition, timeline graph 205 of FIG. 2A illustrates information about two example types of capacity utilization metrics that will be monitored for the computing node group and that will be used to determine whether various of the triggers 250 are satisfied, which in this example includes aggregate average CPU utilization 205*a* for the computing nodes of the group and aggregate average network bandwidth utilization 205*b* for the computing node group—such capacity utilization metrics may be chosen, for example, to reflect relevant performance characteristics of interest for the executing software program(s). The timeline graph 205 further indicates that, in this example, a system-defined target range is established for the specified capacity utilization metrics between an upper bound 208*a* of 60% and a lower bound 208*b* of 40%, with a preferred state corresponding to capacity utilization of 50%—it will be appreciated that other values may be used in other situations, including to have different target ranges for different capacity utilization metrics, and that in some embodiments the user may further specify some or all of the information about the preferred state and target range. Thus, while the information for the initial defined capacity modification policy is provided in this example by the execution capacity management system, the user may specify some or all such information in other embodiments and situations.

In response to the received user request to initiate the providing of the computing node group, the PES (not shown) initiates a computing node group for the user that initially includes sixty computing nodes, in accordance with the initial computing node quantity. As is shown in the timeline graph 210, however, the sixty computing nodes are not actually immediately available, as it takes some time to provision and make available the computing nodes for use as part of the computing node group, including having the program copy be executed on each of the computing nodes by the PES or the user. In particular, after an initial brief time has passed, some program execution capacity for the computing node group becomes available, which corresponds to a first 56 of the 60 computing nodes being available. Accordingly, the illustrated actual computing node quantity 220 for the computing node group increases from 0 to 56 at that time. In addition, at the same time or shortly thereafter, the timeline graph 205 indicates that the aggregate average CPU utilization 205*a* and aggregate average network bandwidth utilization 205*b* performance characteristics begin to be tracked based on operation of the available computing nodes of the group. Shortly after the first 56 computing nodes become available, a subsequent change in the available program execution capacity from the group corresponds to three additional computing nodes becoming available for use as part of the computing node group, as illustrated by the actual computing node quantity information 220 at approximately time T04. However, the final computing node does not become available within the group in this example until an additional time after the other computing nodes are already available. In the current example, a hardware problem occurred with the computing node that is initially selected to be the final computing node, although in other situations, a similar delay may occur if only 59 total computing nodes were initially available for use in the computing node group (with the 60th computing node being dynamically added as soon as it later becomes available).

Accordingly, at approximately time T04, the PES terminates the original 60th computing node if appropriate (e.g., if it is frozen in an intermediate state), and initiates the providing of a replacement 60th computing node.

The time intervals (e.g., from time T01 to time T02, from time T02 to time T03, etc.) may have varying durations in various embodiments (e.g., 1 minute, 5 minutes, 1 hour, etc.), with the time to provision a computing node and make it available within the group being, for example, between 1 minute and an hour. In addition, in this example, the PES (or other third-party system) performs monitoring of the computing nodes of the group in a substantially continuous manner, such that the performance characteristics 205*a* and 205*b* and the actual computing node quantity 220 information reflect up-to-date information, although such monitoring may occur in other manners in other embodiments (e.g., some or all of the computing nodes in the group may execute software that self-reports characteristics of the computing node on which it executes).

After the 60 computing nodes of the computing node group operate in the intended manner for several time intervals, a change occurs in the actual computing node quantity 220 at approximately time T7, prompted by one of the computing nodes of the group failing or otherwise becoming unavailable. A corresponding event E1 265 is shown at approximately the same time as the change, in which the program execution service initiates the termination of the unavailable computing node as needed, and in this example automatically initiates the providing of a replacement computing node. Subsequently, in this example, a change is completed at approximately time T08 that returns the actual computing node quantity 220 to 60 as the replacement computing node becomes available for use as part of the computing node group. No other computing node capacity availability changes or related events occur in this example during the remainder of the initial time period 260*a* from time T01 to time T11, including none of the specified triggers 250 being satisfied so as to trigger a possible dynamic program execution capacity modification for the group.

During the second time period 260*b* from time T11 to time T21, additional events do occur, however. In particular, at approximately time T15, an event E2 occurs that corresponds to an automated determination by the execution capacity management system that trigger TR-1 250*a* (as shown in FIG. 2B) has been satisfied by the increasing aggregate average CPU utilization 205*a*, as is graphically illustrated in the timeline graph 205 with a first black oval (from left to right) on the aggregate average CPU utilization 205*a* line. The trigger TR-1 satisfaction corresponds in this example to a request to increase the computing node quantity by 5% (currently 3 computing nodes, based on the 60 computing nodes currently in the computing node group), for a total desired computing node quantity 215*b* of 63—thus, the 5% increase in the average CPU utilization above the ideal 50% level results in a proportional 5% increase in the computing node quantity in this example for the initial capacity modification policy in use. In other situations, the increase corresponding to the trigger may be specified in other manners, such as to increase the quantity of computing nodes by a fixed number. In the illustrated example, before performing the request initiated by the automated trigger TR-1, the execution capacity management system automatically governs the request based at least in part on specified upper and lower bounds 225. Thus, the execution capacity management system first determines whether the new program execution capacity that would result from the requested modification is within the range of allowed computing node quantities, and optionally may further determine if one or more other criteria are also satisfied, as discussed in greater detail elsewhere. In this example, the new program execution capacity that would result from the requested modification from event E2 is a total computing node quantity of 63, which is within the specified upper bound 225a value of 65, and so the execution capacity management system initiates the increase for the modification, as reflected in the corresponding increase in the actual computing node quantity 220 and corresponding increase in program execution capacity for the group that occurs shortly after event E2.

However, even with the increased computing node quantity and corresponding program execution capacity, the average CPU utilization 205a continues to climb in this example, and passes the target range upper bound 208a at approximately time T16, beginning a period of time 212 during which an adverse event lasts, based on the average CPU utilization being outside the target range. The average CPU utilization 205a may continue to climb after the initial addition of the three extra computing nodes to the computing node group for a variety of reasons, including the following: the execution capacity of the computing node group scaled proportionally to the computing node increase (e.g., both execution capacity and computing node quantity increase by 5%), but a spike in external requests being received by the computing node group (or other work being done by the computing node group) increases at a faster rate; the spike in external requests being received by the computing node group increases at approximately the same rate as the computing node quantity increase (here 5%), but the execution capacity of the computing node group does not increase proportionally to the computing node increase (e.g., due to increasing overhead between different computing nodes of the group to manage distributed operations of the larger computing node group); etc.

In this example, when the average CPU utilization passes the target range upper bound 208a, it triggers another event E3 corresponding to an automated determination by the execution capacity management system that trigger TR-2 205b is satisfied, as is graphically illustrated in the timeline graph 205 with a second black oval on the aggregate average CPU utilization 205a line. The trigger TR-2 satisfaction corresponds to a request in this example to increase the computing node quantity by an additional 5% (or 3 additional computing nodes), for a total desired computing node quantity 215c of 66—thus, the 10% increase in the average CPU utilization above the ideal 50% level results in a proportional 10% overall increase in the computing node quantity in this example for the initial defined capacity modification policy. In the illustrated example, before performing the request initiated by the automated trigger TR-2, the execution capacity management system automatically governs the request based at least in part on specified upper and lower bounds 225. Thus, the execution capacity management system first determines whether the new program execution capacity that would result from the requested modification is within the range of allowed computing node quantities, and optionally may further determine if one or more other criteria are also satisfied, although such governing may not be performed in other embodiments. In this example, the new program execution capacity that would result from the requested modification from event E2 is a total computing node quantity of 66, which is above the specified upper bound 225a value of 65. Accordingly, in the illustrated example, the execution capacity management system selects an altered new amount of program execution capacity that is equal to the upper bound, and initiates an alternative modification that will raise the total program execution capacity to the altered new amount, although in other embodiments other actions may be taken instead of or in addition to initiating such an alternative modification—thus, in this example, the alternative modification is for 2 additional computing nodes to be added to the 63 computing nodes currently in the group, to the altered new total amount of 65 computing nodes. Accordingly, the system initiates the increase for the alternative modification, as reflected in the corresponding increase in the actual computing node quantity 220 and corresponding increase in program execution capacity for the group that occurs shortly after event E3. For comparison purposes, the current example illustrates not only the governed actual computing node quantity 220a that results after event E3, but also illustrates a separate hypothetical non-governed computing node quantity 220b that would have resulted if the dynamic program execution capacity modification requests were not governed based at least in part on the upper bound. After the additional computing nodes are added to the computing node group, the average CPU utilization 205a begins to decrease, and passes below the target range upper bound 208a at approximately time T19.

During the third time period 260c, an additional event and computing node capacity change occurs. In particular, in this example, the aggregate average CPU utilization 205a eventually drops below a threshold of 45% corresponding to a criterion specified for trigger TR-3 250c of FIG. 2B, causing an event E4 to occur, as is graphically illustrated in the timeline graph 205 with a third black oval on the aggregate average CPU utilization 205a line. The trigger satisfaction initiates an automated request to decrease the computing node quantity of the group by 5% (or 3 computing nodes), for a total computing node quantity 215d of 62, although the total computing node quantity would instead be 63 computing nodes if the previous request corresponding to event E3 had not been automatically governed based on the upper bound 225a. In the illustrated example, before fulfilling the request initiated by the automated trigger TR-3, the execution capacity management system automatically governs the request based at least in part on the execution capacity upper and lower bounds, in a manner similar to that previously described with respect to events E2 and E3. In this example, the new program execution capacity that would result from the requested modification from event E4 is within the allowed range. Accordingly, in the illustrated example, the execution capacity management system initiates the requested modification to lower the total program execution capacity to the requested new amount, as reflected in the corresponding decrease in the actual computing node quantity 220 and corresponding decrease in program execution capacity for the group that occurs shortly after event E4. The initial portion of the example use of Group1 ends shortly before time T31 in this example.

In addition, while the dynamic modification activities corresponding to events E1-E4 are illustrated in this example as each occurring at a single point in time, it will be appreciated that some or all such activities may actually take place over a period of time, and further may have other effects that last over a period of time. For example, in at least some embodiments, some or all changes to program execution capacity of a computing node group that are initiated by the execution capacity management system may result in a temporary lockdown period in which at least some other types of changes may not be allowed. The program execution capacity changes that may cause such a lockdown may include, for example, program execution capacity increases and/or decreases that are automatically initiated by the execution capacity management system (e.g., to add new computing nodes, to remove existing computing nodes, etc.), and/or program execution capacity changes that are initiated immediately in response to a PES problem (e.g., a computing node failure, etc.). Such lockdowns may have durations of various types (e.g., until a specified result or occurrence, such as until a computing node being added has become available; a specified length of time, such as the average or expected time for a computing node being added to become available; etc.), and in some embodiments may vary based on the type of change. During such lockdowns, at least some types of events or changes may not be allowed. Furthermore, in some embodiments, a user associated with a computing node group may similarly specify a cooldown period that operates in a similar manner to that of a lockdown, such as a cooldown period of a specified amount of time that follows a lockdown, or instead takes effect at other times. As with the lockdown, during the cooldown period, at least some types of events or changes may not be allowed, such as to not allow user-specified triggers to be satisfied (or by ignoring any such trigger satisfactions) during the cooldown period. It will be appreciated that users and/or the PES may control modifications to computing node groups in other manners in other embodiments.

FIG. 2B illustrates information previously discussed with respect to FIG. 2A, including example trigger information 250 and example event information 290. In particular, FIG. 2B illustrates an example database table data structure 290 that stores various information related to the example events that occurred for the example computing node group Group1 of FIG. 2A. Example table 290 includes a variety of rows or entries 295a-295d that each corresponds to one of the example events E1-E4 discussed with respect to FIG. 2A, with various fields or columns 290a-290f illustrated for each row. In particular, in this example, each row includes a unique identifier ("ID") 290a, an ID 290b of the applicable computing node group to which the event corresponds, a type 290c of the event, information 290d about the source of the event, a time 290e of the event, an example time period 290f during which the event takes place or otherwise with which the event is associated, and optionally various other information (e.g., a particular user associated with received user instructions). As one illustrative example, row 295c corresponds to event E3 for Group1, in which the satisfaction of the trigger TR-3 250c during the second time period caused a request that the computing node quantity of Group1 be increased by 3 computing nodes, although that request was subsequently governed and reduced to an alternative quantity change of 2 computing nodes. The other rows include similar information.

FIG. 2C illustrates additional information corresponding to the performance information that is tracked or otherwise used by the execution capacity management system to make automated modifications to defined capacity modification policies to reflect actual operation of computing node groups executing software programs.

In particular, FIG. 2C includes a graph 207 in which tracked information from the performance of Group1 of FIG. 2A is illustrated and analyzed. In this example, at least some of the information from graph 205 of FIG. 2A is shown again here—in particular, some of the information for the capacity utilization metric corresponding to aggregate average CPU utilization 205a is shown in graph 207. The subset of the information in graph 207 may in some situations correspond to some or all of the performance of Group1 from time T01 to T31, although in the illustrated embodiment, the subset of the information in graph 207 is selected to correspond to the adverse event during time period 212, and optionally some amount of additional buffer time before and/or after the time period 212, such as to include the time for the preceding events E2 and E3—in this manner, the performance information that is analyzed represents a possible failure of the initial capacity modification policy that was in use, which may be improved upon by the execution capacity management system based on the learned feedback from the actual operation of computing node group Group1 executing its one or more software programs for User UUU. In addition, in at least some embodiments, information about events and problems that occur due to problems external to the executing software programs, such as failure of a computing node provided by the PES, may be identified and excluded from the information that is analyzed if possible— thus, if event E01 (involving the failure of a computing node operating in the group) and/or the initial failure at time T04 of one of the initial 60 computing nodes to begin executing had caused adverse events, such information may be excluded (or deemphasized, such as via weighting) in at least some embodiments. Furthermore, in some embodiments, if one or more problems are identified of one or more defined types, such as corresponding to one or more types of operations of the PES or other related system, the execution capacity management system may determine to not make any modifications to the initial capacity modification policy. For example, if the execution capacity management system is unable to obtain accurate information and/or sufficient information (e.g., for at least a minimum period of time) about the monitored performance of the computing node group, the execution capacity management system may decline to make modifications to the initial capacity modification policy until sufficiently accurate and plentiful information is available. The one or more defined types of problems may have various forms in various embodiments, such as, for example, one or more of the following: the ability of the PES to accurately monitor performance of the group of computing nodes, or for the execution capacity management system to otherwise obtain accurate information about such monitored performance; the ability of the PES to supply additional program execution capacity to the computing node group upon request, etc.). It will be appreciated that problems causing suspension of modifications to capacity modification policies may be of various types and may be identified in various manners.

In this example, information about the measured values of the aggregate average CPU utilization 205a is reflected along the horizontal X axis, represented as a percentage change from a central preferred state 209 (e.g., corresponding to a measured 50% value for average CPU utilization), while the vertical Y axis reflects a percentage change in the execution capacity of the computing node group. The illustrated linear and proportional initial scaling curve 206 reflects the initial scaling that was performed for the initial defined capacity modification policy, as reflected in the initial triggers 250a-250c of FIG. 2B. Thus, the initial scaling policy involved a linear proportional change in the execution capacity, with respect to an observed change in the measured values of the aggregate average CPU utilization. Accordingly, when the aggregate average CPU utilization reached a level of 55% (or 5% above the preferred state of 50% for this example), the trigger 250a initiated a 5% increase in the execution capacity of the computing node group, as represented by modification amount 204 on the initial scaling curve 206 displayed on graph 207. Similarly, when the aggregate average CPU utilization reached a level of 60% (or 10% above the preferred state of 50% for this example), the trigger 250b initiated a 10% total increase in the execution capacity of the computing node group, as similarly illustrated by the point at which the initial scaling curve 206 passes the target range upper bound 208a (corresponding to a measured value of 60% (or 10% above the preferred state of 50% for this example). If the linear proportional scale for the initial scaling curve 206 was correct, those percentage increases in the program execution capacity would be expected to result in corresponding percentage decreases of 5% and 10% in the average CPU utilization after those program execution capacity increases took effect.

However, the 5% increase in the execution capacity of the computing node group corresponding to event E02 did not prevent the adverse event from happening, and in particular did not result in a corresponding 5% drop in the measured value of the aggregate average CPU utilization metric after the 3 computing nodes were added to the computing node group. Instead, the period of time between event E02 and E03 included an additional 5% increase in the measured value of the aggregate average CPU utilization metric. In some embodiments and situations, that additional 5% increase in the measured value of the aggregate average CPU utilization metric after the 5% increase in the program execution capacity may be normalized as part of the analysis performed by the execution capacity management system, such as with respect to the quantity or rate of incoming requests received during that time period, or with some other measure of the amount of demand or load on the software program(s) being executed on the computing node group.

Due to the occurrence of the adverse event (optionally in combination with one or more other adverse events, not shown), the execution capacity management system determines to automatically modify the initial defined capacity modification policy being used for the computing node group from time T03 to just before time T31. FIG. 2C further illustrates two examples of manners in which the initial defined capacity modification policy may be modified, although it will be appreciated that the modifications to the initial defined capacity modification policy may take a wide variety of other forms in other situations and embodiments. In this example, the illustrated modified scaling curve A 206a illustrates a first example of a manner in which the initial defined capacity modification policy may be modified. In particular, in this example, the form of the modified scaling curve A 206a continues to be the same as that of the initial scaling curve 206 (in this example, a straight line that passes through the center point corresponding to 0% change in execution capacity for % change in CPU utilization), but the slope of the modified scaling curve A 206a has been increased to indicate a greater amount of percentage change in execution capacity to produce a given percentage change in CPU utilization. Thus, for example, the modification amount 204a illustrates a larger 10% change in program execution capacity to produce a 5% change in CPU utilization, and example modified triggers 252 have similarly been updated for the modified capacity modification policy. Such a modified scaling curve A 206a may be appropriate to use if, for example, the observed performance behavior of the computing node group shows a decrease of 5% in CPU utilization when the program execution capacity is increased by 10%, after being normalized. Alternatively, the modified scaling curve A 206a may reflect a determined amount of change to make in each modification to the current capacity modification policy in use, until the incremental modifications result in a modified capacity modification policy that eliminates or minimizes adverse events to a desired degree, or that otherwise satisfies one or more criteria of interest. The illustrated modified scaling curve B 206b illustrates a second alternative example of a manner in which the initial defined capacity modification policy may be modified, which instead changes the form of the initial scaling curve 206 from a straight line to another type of curve, and with modification amount 204b corresponding to a lower amount of percentage change in program execution capacity to correspond to the same 5% change in average CPU utilization.

While the modified capacity modification policy in this example includes a modified scaling curve, other types of capacity modifications may be included as part of the modified capacity modification policy in other embodiments, whether instead of or in addition to modifications to the scaling curve. As one example, it was previously noted that the adverse event may be based at least in part on an increase in external requests incoming to the software program(s) being executed on the group of computing nodes—thus, in some embodiments and situations, the modification capacity modification policy may include a trigger or other information to initiate throttling of incoming requests in similar future situations, such as if a particular capacity utilization metric has a measured value that reaches a defined threshold, including if a metric corresponding to the incoming requests (e.g., a rate of incoming requests, a rate of change of incoming requests, a cumulative quantity of incoming requests, etc.) reaches a determined value. It will be appreciated that these and other types of information may be specified in a capacity modification policy in a wide variety of manners.

In addition, while the determination to modify the capacity modification policy is made in this example based at least in part on the occurrence of one or more adverse events including capacity utilization metrics values that are outside a specified target range, a determination to modify a capacity modification policy may be made in other manners in other embodiments. As one example, a determination to modify a capacity modification policy may be made based at least in part on prediction information about the expected performance of one or more executing software programs on a group of computing nodes, whether instead of or in addition to based on the occurrence of one or more adverse events. Thus, an initial scaling curve may be used to generate prediction information about how measured values of capacity utilization metrics are expected to change in response to changes in program execution capacity, or more generally, the values of one or more capacity utilization metrics may be predicted in other manners for one or more particular software programs and one or more times—for example, automated or manual predictions may be generated or received related to the quantity of incoming requests that will be received by the executing software program(s), or similarly other measures of the workload of the executing software programs may be predicted. When such prediction information is available, the predicted execution-related values may be compared to the actual measured performance values from the execution of the software program(s), and a capacity modification policy may be modified to correspond to the differences between the predicted and actual values. As one example, if the actual load on the software program(s) exceeds the predicted load by at least a specified amount (e.g., more than a specified threshold), the capacity modification policy may be modified to increase program execution capacity more quickly (e.g., to reflect an increase in the rate of program execution capacity increase that matches or is otherwise based on the rate by which the actual load exceeds the predicted load). It will be appreciated that the capacity modification policy may be modified in a variety of manners to increase or decrease program execution capacity in light of a specified set of conditions, as discussed in greater detail elsewhere herein. Additional details related to predicting information for executing software programs are included in pending U.S. patent application Ser. No. 12/961,285, filed Dec. 6, 2010 and entitled "Predicting Long-Term Computing Resource Usage," which is hereby incorporated by reference in its entirety.

After a modified version of the capacity modification policy is generated by the execution capacity management system, it may be employed in various manners. As one example, the analysis and modification by the execution capacity management system may be performed while the use of the computing node group continues, and the modified capacity modification policy may be dynamically used for ongoing continuing execution of the same software programs on the same computing node group, such as from time T31 onward. As another example, the modified capacity modification policy may be used for the next time that the same user executes the same software programs, even if on a different group of computing nodes (e.g., having a different quantity of computing nodes, having at least some of the computing nodes of the group being different, etc.). Other options include otherwise using the modified capacity modification policy for the user (optionally for the execution of different software programs and/or with different computing node groups) and/or for the software program(s) (optionally for execution by other users and/or with different computing node groups).

It will be appreciated that the analysis of the performance information from the actual performance of the computing node group may be performed in various manners in various embodiments. For example, while the analysis and use of measured performance information in FIG. 2C was performed with respect to a single capacity utilization metric, it will be appreciated that multiple capacity utilization metrics may similarly be analyzed and used in other embodiments and situations, whether in combination or individually. In addition, non-limiting examples of types of factors that may be considered for the measured average CPU utilization values during the adverse event, such as to determine whether to modify the current capacity modification policy based on a single adverse event, include the following: an amount of time to get back to the preferred state; an amount of time to get back to the target range; after a specified amount of time, are the measured average CPU utilization values converging back to the preferred state; after a specified amount of time, what is the current rate of change for the measured average CPU utilization values; etc. Various types of curve fitting techniques and/or control variable manipulation techniques may be used as part of determining particular modifications to make to a capacity modification policy.

In addition, various changes may be employed in other embodiments with respect to the techniques described corresponding to FIGS. 2A-2C. For example, in the scenario of FIGS. 2A-2C, the program execution service used an initial capacity modification policy, with the monitored performance corresponding to use of that initial capacity modification policy, and with the determined new capacity modification policy from the execution capacity management system being an updated version of that initial capacity modification policy that is modified in one or more manners. In other embodiments and situations, the execution capacity management system may generate a determined new capacity modification policy that is not an updated version of an initial capacity modification policy, whether due to the lack of any such initial capacity modification policy corresponding to the monitored performance, or otherwise based on the techniques used to generate the determined new capacity modification policy—as one example, the monitored performance may correspond to modifications to execution capacity that are made based on user instructions and/or other types of changes to the computing nodes of the group (e.g., computing node failures, and optionally replacements).

In addition, in at least some embodiments and situations, the execution capacity management system may determine one or more candidate modifications to the initial capacity modification policy and suggest them to the user for approval, whether in addition to or instead of making some types of changes automatically without such explicit user approval. For example, the one or more candidate modifications to the initial capacity modification policy may include one or both of the modified scaling curves 206a and 206b, and/or may include changes in the upper or lower bonds 225 for the computing node quantity. In this example, given the constraints of the upper bound 225a during the adverse event, the execution capacity management system may prompt the user to increase the upper bound 225a, and make such a modification if approved by the user (in the manner illustrated in FIG. 2A after time T31). Other types of modifications to the capacity modification policy may include changes in the preferred state and/or target range, whether made automatically or suggested to the user. User suggestions may occur in various manners in various embodiments, such as information visually displayed to the user via a dashboard GUI ("graphical user interface") provided by the program execution service and/or execution capacity management system, via one or more electronic communications sent to the user (e.g., email, text message, telephone call, etc.), etc.

Thus, in the manners described above, the execution capacity management system may operate to manage the program execution capacity provided to a user by a group of computing nodes, including to make various dynamic modifications to a capacity modification policy used with the computing node group based on a variety of circumstances. It will be appreciated that the preceding examples of FIGS. 2A-2C are provided for illustrative purposes, and other embodiments may differ in various ways from the examples. For example, although the program execution capacity is measured and modified based on a quantity of computing nodes in these examples, such as if the various available computing nodes are treated as being equivalent (e.g., having equivalent computing resources), other embodiments may be provided where various of the available computing nodes may be of different types with varying characteristics (e.g., different amounts of processing capacity, memory, platform specification, etc.), and/or in which program execution capacity is tracked in manners other than computing node quantity. In some such embodiments, various of the requests may include indications of one or more specific types of the computing nodes for use in groups of computing nodes selected to execute programs associated with the requests, and those requests may only be fulfilled on the corresponding specified type of computing node.

As previously noted, in some embodiments the execution capacity management system may be part of or otherwise operate in conjunction with a program execution service, such that the operations by the execution capacity management system for a group of computing nodes being managed by the program execution service for a user is automatically performed by the execution capacity management system and program execution service without concurrent review and/or approval by the user. In other embodiments, the execution capacity management system may be used in other manners, such as if a particular user executes a copy of the execution capacity management system, and the operations of the execution capacity management system for a group of computing nodes includes various other actions taken by the execution capacity management system (e.g., if the group of computing nodes is being provided by a separate program execution service, taking actions that include sending corresponding instructions from the execution capacity management system to the program execution service). In yet other embodiments, the execution capacity management system may be operated by an entity that is a third-party to one or more program execution services and to one or more users that are customers of the execution capacity management system (e.g., for a fee), such that the execution capacity management system performs some or all of the described techniques (e.g., the determining of a capacity modification policy that reflects measured performance information from actual operations) on behalf of those one or more users and/or those one or more program execution services. Furthermore, a user who interacts with the program execution service and/or the execution capacity management system may have various forms in various embodiments, such as an individual human person, an executing software program, a group or business or other entity that may optionally have one or more human representatives, etc.

The described techniques may provide various benefits in various situations. For example, the techniques allow a program execution service and/or one or more users to predefine various types of capacity modification triggers or other capacity modification policy information for a group of computing nodes, and to automatically customize that predefined information to reflect actual operating characteristics of one or more executing programs for one or more users (e.g., based on performance characteristics of a corresponding group of computing nodes). Such automated triggers may have various uses (e.g., to reactively increase the program execution capacity of a group of computing nodes to accommodate a temporary increase in the computing load for the computing node group; to proactively increase or decrease the program execution capacity of a group of computing nodes to accommodate an expected upcoming need for additional program execution capacity and/or an expected upcoming lack of need for existing program execution capacity, such as based on trends over time in particular performance characteristics and/or historical data indicating recurring patterns of program execution capacity use; etc.). Alternatively, a user may desire to maintain the program execution capacity for a group of computing nodes at or near a specified level (e.g., a specified desired constant quantity of computing nodes), and various modifications may be automatically made to the group of computing nodes to maintain the available program execution capacity at that specified level (e.g., to return an actual computing node quantity that has deviated from the specified desired quantity back to that specified desired quantity). Such techniques may be of use, for example, when each of the computing nodes of the group executes a distinct copy of the same program (e.g., to serve as alternatives for an aggregate computing load over the group), and the quantity of computing nodes are modified to manage the amount of work handled by each computing node, or otherwise in situations in which the various computing nodes of a group do not each execute a distinct copy of the same program (e.g., if distinct subsets of the group computing nodes each execute copies of different programs, such as to have some computing nodes execute an application server program and to have other computing nodes execute an associated database server program; if some or all of the computing nodes perform different parts of a single program, such as in a distributed manner; etc.). Furthermore, when adding additional computing nodes to a group, the PES or other system may further optionally take other actions in at least some situations, such as to provision the added computing node to be ready to execute one or more programs, or to further automatically initiate the execution of the one or more programs on the added computing node.

In addition, the program execution capacity of a group of computing nodes may in some embodiments be measured at least in part by the quantity of computing nodes that are part of the group, and may be modified by changing the computing node quantity of the group. Such computing node quantity modifications may be used, for example, in situations in which some or all of the computing nodes in the group provide or have access to the same or similar amounts of computing resources (e.g., amounts of memory, hard drive space, CPU execution cycles, network bandwidth, etc.), such that a given percentage change in computing node quantity corresponds to the same or similar percentage change in total computing resources and program execution capacity of the group. In other embodiments, some or all of the computing nodes of the group may differ in one or more significant manners with respect to the amount of computing resources to which they have access (e.g., if two or more distinct types of computing node configurations are used, if each computing node is configured independently of the other computing nodes, etc.) or otherwise with respect to the types of program execution capacity that they provide (e.g., based on specialized hardware, types of software programs, etc.), but dynamic program execution capacity modifications for the group may nonetheless be based at least in part on modifying a quantity of the computing nodes of the group, or instead may be based in other manners (e.g., changing from one type of computing node configuration to another).

Furthermore, in at least some embodiments and situations, the program execution capacity of a group of one or more computing nodes may be measured and modified in manners other than a quantity of the computing nodes, such as based on an aggregate amount of one or more types of computing resources provided by the group (e.g., amounts of memory, hard drive space, CPU execution cycles, network bandwidth, etc.). In addition, in at least some embodiments, additional factors may be considered in measuring and specifying program execution capacity for a group of computing nodes, such as a geographical location of some or all of the computing nodes, inter-relationships between some or all of the computing nodes (e.g., to be separated by at most a maximum geographical distance or at least a minimum geographical distance, to be separated by at most a maximum network latency or at least a minimum network latency, to be separated into two or more independent data centers or other computing node collections that are unlikely to fail simultaneously, etc.), availability of specialized hardware capabilities and/or software capabilities, etc.

As previously noted, users may predefine various types of triggers related to dynamically modifying program execution capacity for groups of computing nodes, and those triggers may be later used to initiate corresponding automated dynamic program execution capacity modifications for computing node groups of the users. As one example, a trigger may be defined that specifies a particular desired quantity of computing nodes or desired aggregate amount of one or more computing resources, such as may be used to automatically maintain a corresponding computing node group at that desired computing node quantity or desired aggregate computing resource amount, or instead to change to a specified computing node quantity or aggregate computing resource amount if specified criteria are satisfied. In other situations, a trigger may be defined that specifies a particular absolute or relative change in computing node quantity or aggregate amount of one or more computing resources, such as may be triggered if one or more indicated performance characteristics of the computing node group reach a specified threshold or otherwise satisfy a specified criteria (e.g., remain within a specified range for a specified period of time; show a particular trend, such as a specified amount of change over a specified period of time, or such as a particular "acceleration" or rate of change; match or other correspond to one or more specified patterns, such as from historical data that indicates recurring patterns of program execution capacity use; satisfy a specified logical or other combination of values for multiple performance characteristics, such as may be combined using logical operators such as AND, NOT, OR, etc. and/or in other manners; etc.).

In other embodiments and situations, a predefined trigger may be otherwise satisfied based on information that is not part of the performance characteristics of the computing node group (e.g., based on a current time matching one or more specified times that are part or all of the criteria for a particular trigger; based on status information for one or more programs being executed on the current computing node group that is measured in manners other than performance characteristics, such as a current computing load as indicated by, for example, an amount of work that is queued for or otherwise known or expected to be performed by the one or more programs; based on performance characteristics or other status information for one or more other executing programs that are not being executed by the current computing node group, such as if the current computing node group is interacting with or otherwise supporting the other executing programs so as to, for example, increase the program execution capacity of the current computing node group as the computing load on the other executing programs increases or decreases; etc.). Such performance characteristics may be based on any measurable attribute of or other metric corresponding to the operation of one or more of the computing nodes of the group, including the following non-exclusive list: an absolute or relative amount of use of one or more computing resources of a single computing node (e.g., a percentage amount of available memory being used or CPU cycle utilization, an absolute amount of network bandwidth being used, etc.); an absolute or relative amount of aggregate use of one or more computing resources of all of the group computing nodes; an absolute or relative amount of latency or other delay in responding to communications from external computing systems; an absolute or relative amount of failures of the computing nodes in performing one or more desired actions; etc.

Furthermore, in at least some embodiments and situations, rather than having a trigger directly specify a particular program execution capacity modification that is to occur when it is satisfied, the satisfaction of the trigger may cause a designated system or module to be notified, and that system or module may request a particular program execution capacity modification (e.g., a predefined capacity modification that does not vary; a capacity modification that is dynamically determined at the time of the notification, such as based on then-current conditions; etc.). In addition, the PES or other system may in some embodiments perform various operations to monitor a group of computing nodes in order to determine some or all of the performance characteristics for the triggers associated with the group, or may otherwise obtain such monitored performance characteristics from another source (e.g., from third-party software that monitors the computing nodes, from software executing on a computing node to monitor that computing node and optionally report the monitored information, etc.). Furthermore, in some embodiments, the PES or other system may have system-defined triggers that initiate dynamic program execution capacity modifications when indicated trigger criteria are satisfied, or may otherwise automatically determine to make some types of changes to computing node groups in specified circumstances.

In addition, in at least some embodiments, a PES or other system may further perform other types of activities as part of managing groups of computing nodes. For example, as previously noted, the PES or other system may determine to add or remove computing nodes from a computing node group at various times, including the following: in response to one or more satisfied triggers; in response to a received user instruction; in response to automated activities of the PES or other system, such as to replace a failed computing node and/or to terminate and remove a computing node whose ongoing operation is inhibited; etc. In at least some embodiments, the PES or other system may further consider other factors when determining the exact timing for at least some such computing node group modifications. For example, in situations in which a user will be held responsible for the use of a given quantity of computing nodes for a given period of time (e.g., has already been charged for X computing nodes for the next hour), such information may be used to determine timing related to at least some types of modifications to the computing node group. If the PES or other system determines to reduce the quantity of computing nodes in the group below X, the PES or other system may determine to wait until near or at the end of a time period (e.g., the end of the hour for which the user has already been charged) before actually reducing the computing node quantity below X.

As previously discussed, various types of functionality may be provided and used by a PES in various embodiments, and the functionality may be provided in various ways. For example, in some embodiments, program execution capacity available from a PES may include multiple computing nodes for executing programs on behalf of users, such as via multiple physical computing machines interconnected via one or more networks or other data exchange mediums that are capable of transmitting data between the computing machines. At least some of the computing machines may in some embodiments each include sufficient computing-related resources to execute multiple programs simultaneously (e.g., sufficient writeable memory, non-volatile storage, CPU cycles or other CPU usage measure, network bandwidth, swap space, etc.), and at least some of the computing machines in some such embodiments may each host multiple virtual machine computing nodes that each may execute one or more programs on behalf of a distinct user. Furthermore, in various embodiments, a PES may execute various types of programs on behalf of multiple users. For example, such programs executed on behalf of users may include one or more operating systems, applications (e.g., servers and/or other software applications), utilities, libraries, etc. In addition, in at least some embodiments, such programs may include executable software images, such as virtual machine images that are bootable or otherwise loadable on one or more virtual machine computing nodes, and that each may include operating system software, software for one or more application programs, and/or configuration information, etc. Furthermore, while program execution capacity modifications are made in some examples by changing computing node quantity, in other embodiments such capacity modifications may be made by changing the program execution capacity of one or more computing nodes of the group (e.g., by replacing a first computing node with a second computing node that has more or less of one or more types of computing resources of interest, by modifying the amount of one or more computing resources that are available to one of the computing nodes that are already part of the group, etc.).

In at least some embodiments, the execution of one or more programs on a group of one or more computing nodes by a PES may be initiated in response to a current execution request for immediate execution of those programs. Alternatively, the initiation may be based on a previously received program execution request that scheduled or otherwise reserved the then-future execution of those programs for the now-current time. Program execution requests may be received in various ways, such as directly from a user (e.g., via an interactive console or other GUI provided by the program execution service), or from an executing program of a user that automatically initiates the execution of one or more other programs or other instances of itself (e.g., via an API provided by the program execution service, such as an API that uses Web services). Program execution requests may include various information to be used in the initiation of the execution of one or more programs, such as an executable or other copy of a program to be executed, an indication of a program that was previously registered or otherwise supplied for execution, and a number of instances of the program that are to be executed simultaneously (e.g., expressed as a single desired number of instances, as a minimum and maximum number of desired instances, etc.), as well as a variety of other types of preferences and/or requirements for execution of one or more programs (e.g., resource allocation, geographical and/or logical location for execution, proximity of execution to other programs and/or computing nodes, timing-related criteria, etc.).

After receiving a request to execute one or more instances of a program at an indicated time, the PES may determine one or more computing nodes to use in a group for executing the program instances. In some embodiments, the determination of the computing nodes to be used is performed at the time of the request even if for future execution. In other embodiments, the determination of the computing nodes to be used for future execution of one or more program instances may be deferred to a later time, such as at the future time of execution based on information that is then available. In some embodiments, the determination of which computing nodes to use for execution of one or more programs on behalf of a user may be made prior to a request to execute, such as at a time when a user subscribes and/or registers to use the PES, and/or at another time prior to a request to execute programs for a user. For example, in some such embodiments, one or more computing nodes may be associated with a user for a period of time, such that programs may be executed on behalf of that user on the associated computing nodes at any time during that period, such as at any time a request is received to execute software for the user during the period. In addition, in some embodiments, the determination of which computing nodes to use to execute programs on behalf of a user may be made when one or more computing nodes and/or computing resources of one or more computing nodes become available for executing programs for the user, such as, for example to execute programs of one or more pending requests on one or more computing nodes at a time when the computing nodes are unused and/or are otherwise available for executing the programs. The determination of which computing nodes to use for execution of each program copy or instance may be made in a variety of ways, including based on any preferences and/or requirements specified in the request or otherwise specified for the program and/or associated user (e.g., at a time of registration, etc.). For example, if criteria are determined for preferred and/or required resources for execution of a program instance (e.g., memory and/or storage; CPU type, cycles or other performance metric; network capacity; platform type, etc.), the determination of an appropriate computing node to execute a program instance may be based at least in part on whether a computing node has sufficient resources available to satisfy those resource criteria. Additional details related to executing and configuring programs to execute on a program execution service are included in pending U.S. patent application Ser. No. 11/395,463, filed Mar. 31, 2006 and entitled "Managing Execution of Programs by Multiple Computing Systems," which is hereby incorporated by reference in its entirety.

In some embodiments, fees may be associated with the use of a PES and/or an ECMS, such that the PES may execute programs on behalf of a user in exchange for payment of one or more fees by that user, and/or such that the ECMS may automatically perform some or all of the described techniques on behalf of a user in exchange for payment of one or more fees by that user. For example, in some embodiments, fees may be charged to a user of functionality from an ECMS based on amount of functionality provided (e.g., a duration of time during which the functionality is available, a number of times that the functionality is used, etc.). In addition, in some embodiments, fees may be charged to a user of functionality from a PES based on an amount and/or type of program execution capacity allocated for executing one or more programs on behalf of a user, such as based on one or more of a number of processing units, an amount of memory, an amount of storage, an amount of network resources, etc., allocated for executing programs of the user. In some embodiments, fees may be based on other factors, such as various characteristics of the computing resources used to execute programs, such as, for example, based on CPU capabilities or performance, platform type (e.g., 32-bit, 64-bit, etc.), etc. In some embodiments, fees may be charged on the basis of a variety of use factors, such as a price per use of the service, a price per unit of time that computing services are used, a price per storage used, a price per data transferred in and/or out, etc. In at least some embodiments, as discussed in more detail below, fees may be based on various other factors, such as various properties related to executing programs (e.g., continuity of execution, fault tolerance, etc.). In at least some embodiments, a provider of a PES may offer one or more of various tiers, types and/or levels of services or functionality for executing programs on behalf of multiple users, and in some such embodiments, various fees may be associated with the various tiers, types and/or levels of services. In addition, for example, tiers may be used for a specific type of functionality provided by a PES, such as to charge fees at a first tier for a first quantity of program execution capacity functionality (e.g., up to a specified first threshold of computing nodes being used), to charge fees at a second tier (e.g., a lower price tier) for a second quantity of program execution capacity functionality (e.g., above the specified first threshold and up to a specified second threshold of computing nodes being used), etc. Additional details related to various fees associated with a program execution service are included in pending U.S. patent application Ser. No. 11/963,331, filed Dec. 21, 2007 and entitled "Providing Configurable Pricing for Execution of Software Images," which is hereby incorporated by reference in its entirety.

Furthermore, various other types of functionality may be provided and used by a PES in various embodiments, as discussed in greater detail elsewhere.

Figure 3:
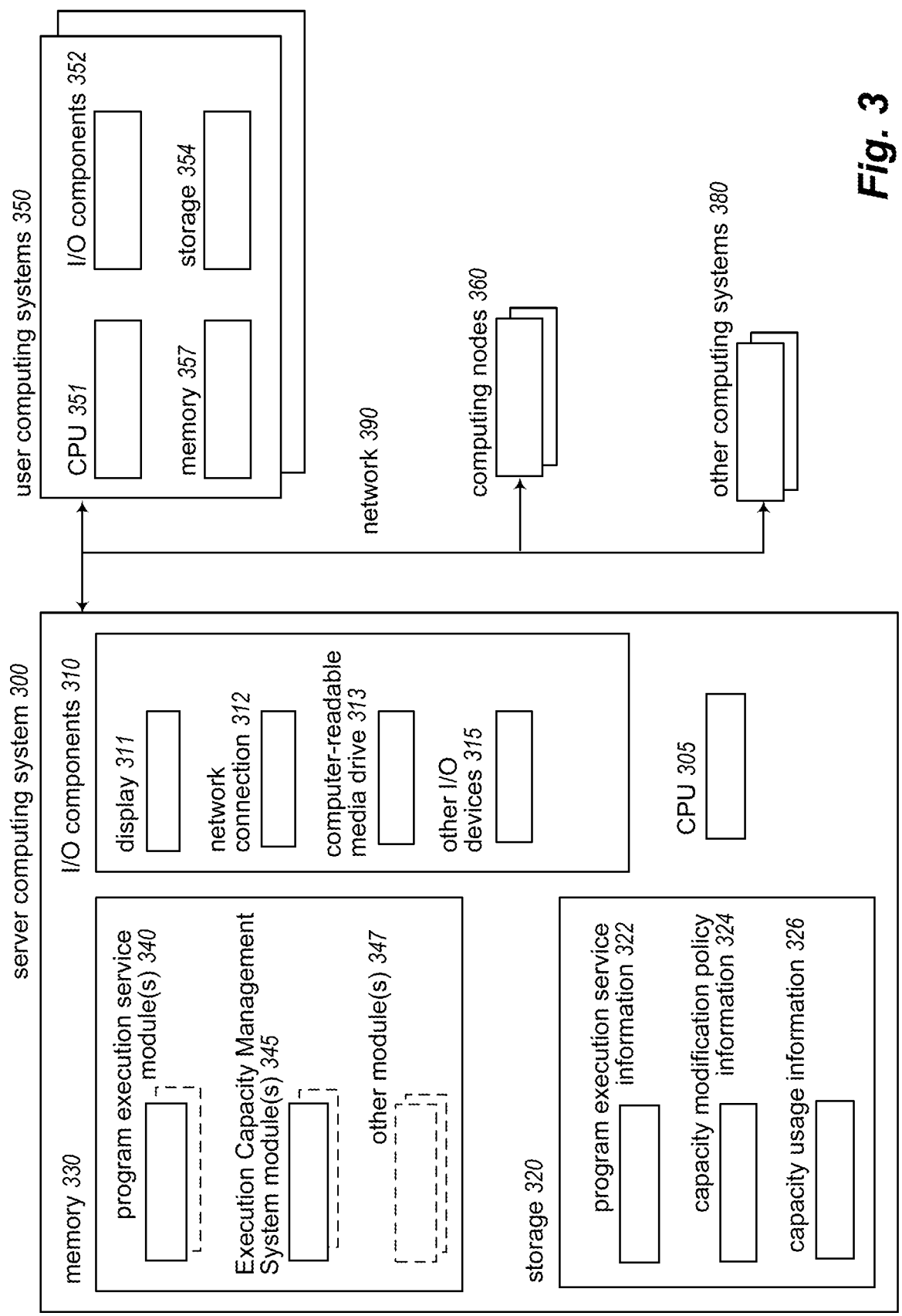
FIG. 3 is a block diagram illustrating an example embodiment of a computing system for managing program execution capacity provided to multiple users.

FIG. 3 is a block diagram illustrating example computing systems suitable for performing techniques to manage groups of computing nodes for multiple users. In particular, FIG. 3 illustrates a server computing system 300 suitable for providing at least some functionality of a program execution service and of an execution capacity management system, although in other embodiments multiple computing systems may be used for the execution (e.g., to have distinct computing systems executing the program execution service and of the execution capacity management system). FIG. 3 also illustrates various client computing systems 350 that may be used by users of the program execution service and/or of the execution capacity management system, computing nodes 360 that may be used by the program execution service, and other computing systems 380. In the illustrated embodiment, the server computing system 300 has components that include one or more hardware CPU ("central processing unit") computer processors 305, various I/O ("input/output") components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated user computing systems 350 may each have components similar to those of server computing system 300, including one or more CPUs 351, I/O components 352, storage 354, and memory 357, although some details are not illustrated for the computing systems 350 for the sake of brevity. The other computing systems 380 and computing nodes 360 may also each include components that are similar to some or all of the components illustrated with respect to server computing system 300, but such components are not illustrated in this example for the sake of brevity.

An embodiment of one or more modules 340 of a program execution service (e.g., a system manager module, such as module 110 of FIG. 1) are executing in memory 330, and in some embodiments each includes various software instructions that when executed program one or more of the CPU processors 305 to provide the described functionality. The module(s) 340 interact with computing systems 350 and 380 and computing nodes 360 over the network 390 (e.g., via the Internet and/or the World Wide Web, via a private cellular network, etc.). In this example embodiment, the module(s) 340 include functionality related to managing use of multiple computing nodes 360 by various users (not shown) interacting with user computing systems 350, such as in conjunction with a program execution service provided by the module(s) 340. The other computing systems 350 and 380 and computing nodes 360 may be executing various software as part of interactions with the module(s) 340. For example, user computing systems 350 may be executing software in memory 357 to interact with module(s) 340 (e.g., as part of a Web browser or specialized client-side application program), such as to configure and/or request execution of programs on behalf of the users of those systems on one or more computing nodes 360 in various ways, as well as to perform various other types of actions, as discussed in greater detail elsewhere. Various information related to the functionality of the module(s) 340 may be stored in storage 320, such as information 322 related to configuration, execution and/or registration for executing programs on behalf of multiple users, information 324 related to capacity modification policies for use with particular users and computing node groups (e.g., information about predefined user-specified triggers; etc.), and information 326 related to monitored capacity usage information for computing node groups being used on behalf of users and/or software programs.

After the module(s) 340 receive requests (or other indications) to execute one or more programs on a group of one or more computing nodes 360, the module(s) 340 select the one or more computing nodes for the group, and initiate execution of those programs on those computing nodes 360. In addition, the module(s) 340 may further interact with computing nodes 360 to later terminate execution of initiated programs on the computing nodes, to migrate one or more of the programs to one or more other computing nodes 360 or computing systems 380, etc. The computing nodes 360 may have various forms in various embodiments, such as to include a number of physical computing systems and/or a number of virtual machines executing on one or more physical computing systems. In some embodiments, the server computing system 300 and computing nodes 360 may be part of a data center or other group of co-located computing systems, or may otherwise be computing nodes of a private network. In addition, in some embodiments, the module(s) 340 may interact with one or more other computing systems 380 to initiate or terminate execution of one or more programs on those computing systems, such as if the computing systems 380 are provided by one or more third-party participants who are providing computing nodes for use by other users. In some embodiments, the module(s) 340 may further or instead manage access to one or more types of computing-related resources or services other than program execution services (e.g., persistent or temporary data storage services, messaging services, database services, etc.).

In addition, the module(s) 340 includes functionality in this example related to monitoring or otherwise interacting with one or more of the computing nodes 360 to track use of those computing nodes, such as to determine current actual program execution capacity or other resource usage capacity of a computing node group and/or to determine current performance characteristics corresponding to some or all computing nodes of a computing node group. As previously noted, such information may be stored on storage 320 and/or elsewhere, and may be used by the module(s) 340 and/or the execution capacity management system in various manners. For example, in some embodiments, if the module(s) 340 discover that a computing node has failed or otherwise become unavailable (e.g., as part of provisioning or otherwise initializing the computing node to be used as part of a computing node group, after the computing node has been in use as part of a computing node group, etc.), the module(s) 340 may automatically take actions to replace the unavailable computing node with a new computing node. In other embodiments, the module(s) 340 may instead not perform some or all of the monitoring of the computing nodes, such as if the module(s) 340 instead obtain information from another source about current actual program execution capacity of a computing node group and/or current performance characteristics corresponding to some or all computing nodes of a computing node group (e.g., as provided by software executing on the computing nodes), and then uses that information to maintain program execution capacity for the computing node group as appropriate.

An embodiment of one or more modules 345 of an execution capacity management system (e.g., module 125 of FIG. 1) are also executing in memory 330, and in some embodiments each includes various software instructions that when executed program one or more of the CPU processors 305 to provide the described functionality. The module(s) 345 in this example interact with the program execution service provided by the module(s) 340 via the server computing system 300 (e.g., via shared memory, an internal bus, etc.), although in other embodiments the execution capacity management system and program execution service may instead interact via one or more intervening networks. In this example embodiment, the modules 345 include functionality related to automatically determining new capacity modification policies to use based at least in part on monitored performance of one or more computing node groups used to execute one or more software programs for one or more users, as discussed in greater detail elsewhere. Various information related to the functionality of the modules 345 may be stored in storage 320, such as information 326 related to capacity usage information for users and/or software programs that is used by the modules 345, and information 324 related to capacity modification policies that is generated and used by the modules 345.

It will be appreciated that computing systems 300, 350 and 380 and computing nodes 360 are merely illustrative and are not intended to limit the scope of the present invention. The computing systems and/or nodes may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system may comprise any combination of hardware or software that may interact and perform the described types of functionality, including without limitation desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated modules 340 and/or 345 may in some embodiments be distributed in additional modules. Similarly, in some embodiments some of the functionality of the modules 340 and/or 345 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the module(s) 340 and/or the module(s) 345) and/or data structures (e.g., defined capacity modification policy information 324), such as by execution of software instructions of the one or more software programs and/or by storage of such software instructions and/or data structures. Furthermore, in some embodiments, some or all of the systems and/or modules may be implemented or provided in other manners, such as by using means that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
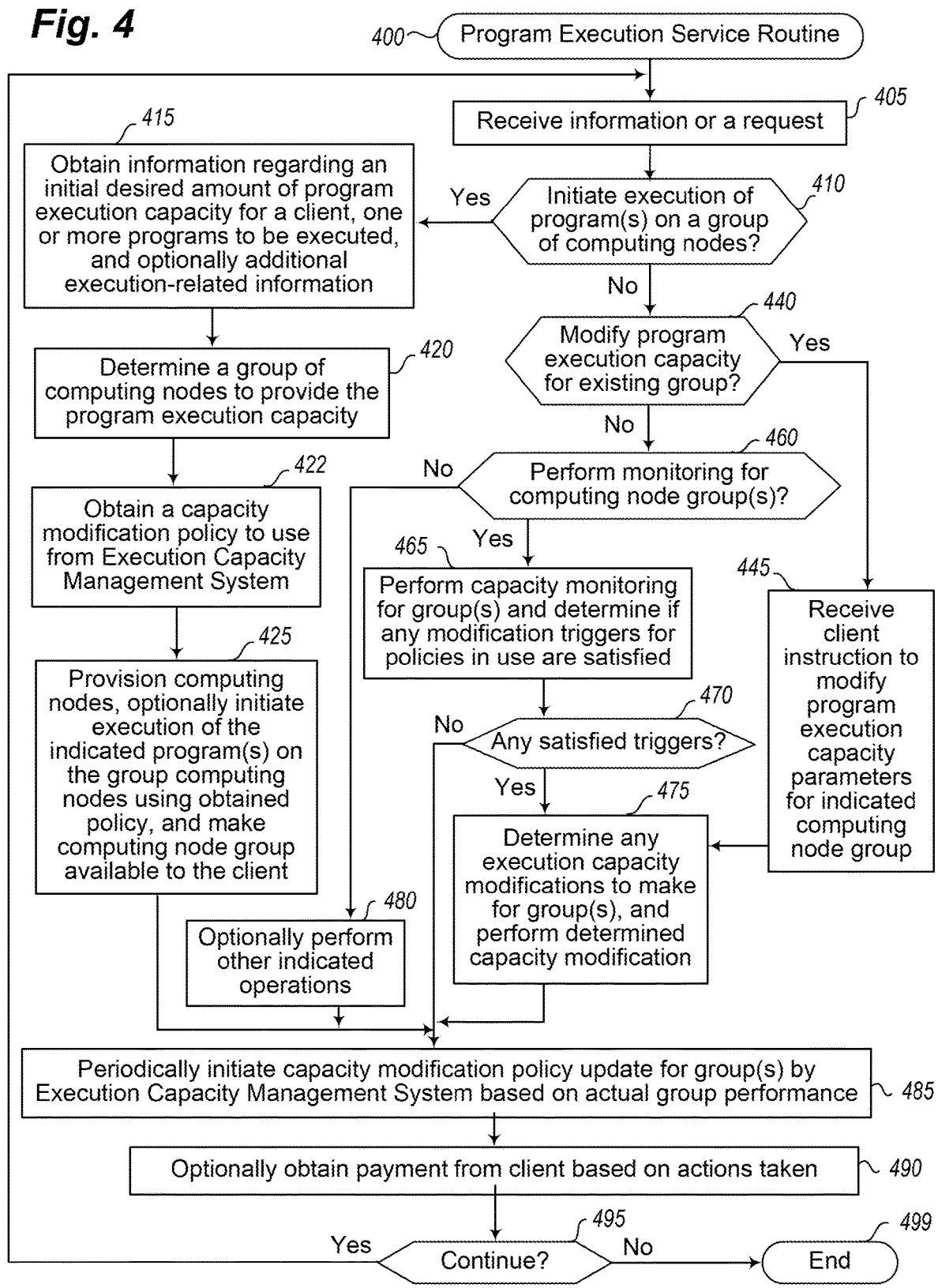
FIG. 4 illustrates a flow diagram of an example embodiment of a Program Execution Service routine.

FIG. 4 is a flow diagram of an example embodiment of a Program Execution Service routine 400. The routine may be provided by, for example, execution of the module 110 of FIG. 1 and/or a module 340 of FIG. 3, such as to assist in managing use of groups of computing nodes for users, as well as to perform other types of management operations in some situations. In this illustrated embodiment, the routine 400 manages various aspects of use of a program execution service that provides program execution capacity for executing programs on behalf of multiple users, and initiates requests to an associated execution capacity management system to provide functionality related to creating and/or modifying capacity modification policies.

In the illustrated embodiment, the routine begins at block 405, where information or a request is received. The routine continues to block 410 to determine if the received request or information is related to initiating execution of one or more programs on a group of computing nodes, such as a request from a user. If so, the routine continues to block 415 to obtain information regarding the requested program execution, such as an initial desired amount of program execution capacity for the computing node group (e.g., a desired computing node quantity), one or more programs to be executed, and optionally additional execution-related information. Such optional additional execution-related information may have various forms, such as an initial capacity modification policy to use (or information that is part of such a policy), including to indicate upper and/or lower bounds for program execution capacity, a preferred state and/or target range to maintain for one or more specified capacity utilization metrics, etc. As discussed elsewhere, in some embodiments, a user may also select from one or more of various types of computing nodes and/or may otherwise specify various amounts and/or types of computing resources desired (e.g., processing unit type/amount, memory amount, platform specification, etc.) in some embodiments. In block 420, the routine then selects the computing nodes to be used for the group, and in block 425 initiates making those selected computing nodes available for the user, such as by provisioning the selected computing nodes and optionally initiating execution of the one or more programs to be executed. In addition, in block 422, the routine obtains a capacity modification policy to initially use for the execution of the program(s) on the selected computing nodes by interacting with the execution capacity management system, although in other embodiments such an initial policy may be determined in other manners (e.g., based on information supplied by the user, based on a default policy used for some or all users, based on a policy previously used for the user and/or the software programs, etc.)—FIG. 5 illustrates one example embodiment of a routine for the execution capacity management system. When the computing nodes are available for use on behalf of the user, the user may be notified of the availability in various manners, or in other embodiments the computing nodes may begin operation in an automated manner without further interaction by the user.

If it is instead determined at block 410 that a request to initiate execution of a group of computing nodes is not received, the routine instead continues to block 440 to determine whether a request is received from a user related to modifying program execution capacity information for an existing computing node group of the user, such as to change the current program execution capacity, to change upper or lower bounds on program execution capacity, to make changes to a capacity modification policy that is currently in use, etc. If so, the routine continues to block 445 to receive the user instruction related to modifying program execution capacity information for an indicated existing computing node group, and then continues to block 475.

If it is instead determined at block 440 that a request to modify program execution capacity information for a group of computing nodes is not received, the routine instead continues to block 460 to determine whether to currently perform periodic or otherwise recurrent activities to monitor information about the program execution capacity for one or more computing nodes groups, although in other embodiments such monitoring may be performed in a continuous or substantially continuous manner. If so, the routine continues to block 465 to perform monitoring of computing node groups being provided or to otherwise gather monitored performance information. In this example embodiment, the output of block 465 includes an indication of any dynamic capacity modification requests that result from satisfied triggers of current capacity modification policies at the current time. Accordingly, the routine continues from block 465 to block 470 to determine whether any such triggers were satisfied, and if not continues to block 485. If it is instead determined in block 470 that one or more triggers were satisfied, or after block 445, the routine continues to block 475 to determine any execution capacity-related modifications to make in accordance with the user instructions and any other specified criteria (e.g., limits in program execution capacity from upper and/or lower bounds on program execution capacity), and the perform the determined capacity modifications.

If it is instead determined at block 460 not to currently perform monitoring activities with respect to the program execution capacity for one or more computing nodes groups, the routine instead continues to block 480 to optionally perform one or more other indicated operations. For example, in some embodiments the routine may receive requests from the execution capacity management system for capacity usage information and/or other information related to program execution capacity being provided by computing node groups for users, and retrieves and supplies such information as information. In addition, in some embodiments the routine may receive new capacity modification policies determined by the execution capacity management system, such as with respect to particular users, software programs, and/or computing node groups, and may store such information for later use, as well as to optionally implement the new capacity modification policies immediately if appropriate (e.g., if they apply to a current computing node group in use). Such operations of block 480 may also include, for example, one or more of the following: responding to user requests related to performing other types of program execution (if the provided program execution service provides such other program execution types), such as to execute a single program on a single computing node; responding to user requests to specify additional triggers or otherwise to modify a capacity modification policy or other configuration information for an indicated computing node group; responding to user requests to obtain various status information related to one or more computing node groups with which the user is associated; responding to requests to perform administrative-related activities for a user, such as subscription, registration, or payment operations; etc.

After blocks 425, 475 or 480, or if it is instead determined in block 470 that no triggers were satisfied, the routine continues to block 485 to periodically request operations of the execution capacity management system to initiate updates to capacity modification policies based on monitored performance corresponding to those policies, although in other embodiments such activities by the execution capacity management system may be initiated in other manners (e.g., continuously or substantially continuously without being prompted). After block 485, or if it is not performed, the routine continues to block 490 to optionally perform user billing activities or otherwise obtain payment from clients based on the information or request received in block 405, or as is otherwise initiated (e.g., periodically), such as to charge and/or collect fees from one or more users based on program execution functionality provided to the users.

After block 490, the routine continues to block 495 to determine whether to continue, such as until an explicit indication to terminate execution of the routine is received. If it is determined to continue, the routine returns to block 405, and if not continues to block 499 and ends. It will be appreciated that additional types of activities may be performed in some embodiments and situations, such as to determine whether users are authorized to perform particular requested operations, to immediately obtain payment from users for some types of requested operations, etc. In addition, while user requests and other operations are indicated in the illustrated embodiment as being performed in a manner specific to a particular computing node group and a particular associated user, in other embodiments some or all such operations may instead be applied more generally, such as to multiple computing nodes groups associated with a single user and/or from multiple users associated with one or more computing node groups.

FIG. 5 is a flow diagram of an example embodiment of an Execution Capacity Management System routine 500. The routine may be provided by, for example, execution of the module 125 of FIG. 1 and/or by one or more of the modules 345 of FIG. 3, such as to automatically determine new capacity modification policies to use based at least in part on monitored performance of one or more computing node groups used to execute one or more software programs for one or more users. In addition, execution of this illustrated embodiment of the routine may be initiated by a program execution service at block 422 and/or 485 of FIG. 4, although in other embodiments the routine may be initiated in other manners (e.g., may automatically determine new capacity modification policies for some or all computing nodes groups in use by one or more program execution services, such as on a continuous or near-continuous basis).

In the illustrated embodiment, the routine begins at block 505, where an indication of a client and one or more software programs is received, along with an associated request. The routine continues to block 510 to determine if the request is to provide or update a capacity modification policy for the client and software program(s), such as with respect to blocks 422 and/or 485 of FIG. 4. If so, the routine continues to block 520 to determine if an existing policy exists for the client and software programs, such as to be updated. If not, the routine continues to block 525 to determine policy information to use for the client without using current monitored usage data, such as to use a default policy shared by some or all clients, by using a policy previously used by the user for one or more other software programs, by using a policy previously used for the software program(s) by one or more other clients, etc. In other embodiments, the routine may further generate a new capacity modification policy for the client if monitored performance usage data is available, such as in a manner similar to that of blocks 545-555.

If it is instead determined in block 520 that an existing policy does exist for the client and software program(s), the routine continues instead to block 535 to retrieve the existing policy. The routine then determines in block 540 whether monitored performance usage data is available that corresponds to the existing policy, such as from recent or current use of the existing policy to execute the software program(s) for the client on a computing node group. If not, the routine continues to block 575 to provide an indication of the current existing policy, and otherwise continues to blocks 545-555 to possibly modify the existing policy based on the monitored performance usage data. In block 545, the routine obtains the usage data, such as by interacting with the program execution service to request the data, retrieving the data from storage, etc. In block 550, the routine then analyzes the usage data to determine how measured values of one or more capacity utilization metrics change in response to changes in program execution capacity during actual operation of the computing node group. In block 555, the routine then determines new capacity modification information to use based on the analyzed data, such as one or more new or modified capacity modification triggers having capacity modification amounts that reflect the analyzed data. As discussed in greater detail elsewhere, such usage data may be analyzed in various manners in various embodiments, and various types of modifications may be made to a capacity modification policy.

After blocks 525 or 555, the routine continues to block 565, where the determined policy (or particular modifications for the determined policy) may in some embodiments be suggested to the client, and made only if approval is received (or made unless disapproval is received). In this embodiment, either approval or alternative policy information is received, and the routine continues to block 570 to store the policy information to be used. In block 575, the policy information to be used is further provided to the requester, such as the program execution service.

If it is instead determined in block 510 that the received request is not to provide or update a capacity modification policy, the routine continues instead to block 580 to determine if a client has requested a modification to a policy of the client. If so, the routine continues to block 585 to perform the requested modification as appropriate, and to store the modified policy for further use. In some embodiments, the routine may further notify the program execution service routine of the modified policy in a manner similar to that of block 575, such as to enable use of the modified policy with ongoing execution of one or more corresponding software programs for the client.

If it is instead determined in block 580 that the received request is not a client modification to a policy, the routine continues instead to block 590 to perform one or more other indicated operations as appropriate. Such other operations may include supplying requested types of information, performing other types of analysis of monitored performance data, etc.

After blocks 575, 585 or 590, the routine continues to block 595 to determine whether to continue, such as until an explicit indication to terminate is received. If it is determined to continue, the routine returns to block 505, and otherwise continues to block 599 and ends.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
monitoring, by one or more configured computing systems that provide a program execution service, performance for a set of computing nodes being used for execution of one or more software programs for a client of the program execution service during a first period of time, wherein the execution of the one or more software programs during the first period of time is based on an initial client-specified capacity modification policy that controls automatic modifications in an amount of program execution capacity of the set of computing nodes during the first period of time, and wherein the monitored performance provides information about how measured values for one or more capacity utilization metrics change to reflect the automatic modifications in the amount of program execution capacity;

determining, by the one or more configured computing systems, an updated capacity modification policy for later use during a distinct second execution of the one or more software programs for the client, wherein the determining of the updated capacity modification policy includes modifying the initial client-specified capacity modification policy based at least in part on the provided information from the monitored performance;

storing, by the one or more configured computing systems, the determined updated capacity modification policy for the later use during the distinct second execution of the one or more software programs for the client; and initiating, during a later second period of time after the first period of time, use of the stored updated capacity modification policy to control additional automatic modifications that are made in an amount of program execution capacity being used for the distinct second execution of the one or more software programs for the client.

2. The method of claim 1 wherein the execution of the one or more software programs during the first period of time is completed before the later second period of time, and wherein the initiating of the use of the stored updated capacity modification policy during the later second period of time includes:

performing, by the one or more configured computing systems, the distinct second execution of the one or more software programs for the client during the later second period of time; and using, by the one or more configured computing systems, the stored updated capacity modification policy to control the additional automatic modifications in the amount of the program execution capacity during the second period of time.

3. The method of claim 2 wherein the performing of the distinct second execution of the one or more software programs for the client includes continuing performing monitoring during the distinct second execution, performing further updates to the stored updated capacity modification policy based on the continued monitoring, and storing a second updated capacity modification policy that includes the further updates for use in controlling one or more subsequent executions of the one or more software programs.

4. The method of claim 1 wherein the stored updated capacity modification policy indicates, for a specified one of the capacity utilization metrics, at least one value for the specified one capacity utilization metric, and a modification to be made corresponding to the at least one value that includes a determined amount of program execution capacity to change for the modification.

5. The method of claim 4 wherein the modification to be made is indicated as a rate of change to make in the amount of program execution capacity relative to a rate of change for values of the specified one capacity utilization metric.

6. The method of claim 4 wherein the program execution capacity is measured based on a quantity of computing nodes that are part of the set, and wherein the modification to be made is indicated as adding one or more new computing nodes to the set, removing at least one of the computing nodes from the set, or adding one or more new computing nodes to the set and removing at least one of the computing nodes from the set.

7. The method of claim 1 wherein the stored updated capacity modification policy indicates at least one value for at least one capacity utilization metric, and a modification to be made corresponding to the at least one value, the modification to be made including throttling incoming requests to the one or more software programs in a specified manner.

8. The method of claim 1 further comprising, before the execution of the one or more software programs during the first period of time, obtaining prediction information corresponding to the execution of the one or more software programs during the first period of time, the prediction information including one or more predicted values for the one or more capacity utilization metrics during the first period of time, and wherein the determining of the updated capacity modification policy to later use for the distinct second execution is based at least in part on differences between the prediction information and the provided information from the monitored performance.

9. The method of claim 1 wherein the automatic modifications during the first period of time are determined as an amount of change to make in the amount of program execution capacity relative to an amount of change for values of at least one of the one or more capacity utilization metrics, and wherein the modifying of the initial client-specified capacity modification policy includes modifying the amount of change to make in the amount of program execution capacity relative to the amount of change for values of the at least one capacity utilization metric.

10. The method of claim 1 further comprising determining the initial capacity modification policy for the client based on configuration information supplied by the client for the execution of one or more software programs.

11. The method of claim 1 further comprising, before the execution of the one or more software programs during the first period of time, obtaining prediction information corresponding to the execution of the one or more software programs during the first period of time, the prediction information including one or more predicted amounts of program execution capacity to be used during the first period of time, and wherein the determining of the updated capacity modification policy to later use for the distinct second execution is based at least in part on differences between the prediction information and the provided information from the monitored performance.

12. The method of claim 1 wherein the determining of the updated capacity modification policy to later use for the distinct second execution of the one or more software programs for the client includes:

identifying, by the one or more configured computing systems, one or more adverse events during the first period of time that include one or more values for at least one of the one or more capacity utilization metrics exceeding a defined threshold; and analyzing information about the identified one or more adverse events to determine one or more types of the additional automatic modifications in the amount of program execution capacity that will be made at future times during the distinct second execution.

13. The method of claim 12 wherein the identified one or more adverse events include a plurality of adverse events, and wherein the analyzing of the information includes excluding any of the plurality of adverse events that reflect problems with the program execution service that are not specific to executing the one or more software programs for the client, and aggregating information from multiple of the plurality of adverse events that remain after the excluding.

14. The method of claim 1 further comprising:
monitoring performance for a second set of computing nodes that execute one or more second software programs for a second client of the program execution service during the first period of time, the executing of the one or more second software programs being performed in accordance with a second initial capacity modification policy;
obtaining information about one or more problems of one or more predefined types that occur during the first period of time; and
in response to the one or more problems of the one or more predefined types that occur during the first period of time, preventing automated updating of the second initial capacity modification policy based on the monitored performance for the second set of computing nodes during the first period of time.

15. The method of claim 1 wherein the determining of the updated capacity modification policy to later use for the distinct second execution of the one or more software programs for the client includes:
determining one or more types of candidate future automatic modifications in the amount of program execution capacity being used;
suggesting each of the determined one or more types of candidate future automatic modifications to the client; and
including each of the determined one or more types of candidate future automatic modifications in the determined updated capacity modification policy only if the client approves the determined type of candidate future automatic modification.

16. A non-transitory computer-readable medium having stored contents that configure a computing system to perform a method, the method comprising:
obtaining, by the configured computing system, information from monitored performance of one or more software programs executing on a group of one or more computing nodes, wherein the obtained information indicates how measured values for one or more capacity utilization metrics change to reflect modifications in an amount of program execution capacity of the group of computing nodes, and wherein the modifications in the amount of program execution capacity of the group of computing nodes are made based at least in part on use of an initial capacity modification policy that controls automatic modifications in the amount of program execution capacity;
determining, by the configured computing system, an updated capacity modification policy to use for later execution of the one or more software programs for a client, and storing the updated capacity modification policy for use during the later execution in controlling additional automatic modifications made in an amount of program execution capacity used during the later execution based on capacity utilization during the later execution, wherein the determining includes modifying the initial capacity modification policy based at least in part on the obtained information from the monitored performance; and
after the storing of the updated capacity modification policy, initiating use of the stored updated capacity modification policy for the later execution of the one or more software programs for the client to control the additional automatic modifications made in the amount of program execution capacity being used during the later execution.

17. The non-transitory computer-readable medium of claim 16 wherein the configured computing system is part of one or more computing systems that provide a program execution service, wherein the client is one of multiple users of the program execution service, wherein the one or more software programs are executing on the group of computing nodes on behalf of the client, and wherein the method further comprises monitoring, by the configured computing system, the performance of the one or more software programs executing on the group of computing nodes and generating the information obtained from the monitored performance.

18. The non-transitory computer-readable medium of claim 16 wherein the executing of the one or more software programs on the group of computing nodes occurs during a first period of time, and wherein the initiating use of the stored updated capacity modification policy for the later execution occurs during a second period of time after the first period of time and further includes:
performing additional execution of the one or more software programs on the group of computing nodes on behalf of the client; and
using the stored updated capacity modification policy to automatically control the additional modifications in the amount of program execution capacity of the group of computing nodes that are made for the later execution during the second period of time.

19. The non-transitory computer-readable medium of claim 16 wherein the computer-readable medium is a memory of the configured computing system that stores the contents, and wherein the contents are instructions that when executed program the configured computing system to perform the method.

20. A configured system comprising:
one or more processors; and
one or more modules that are configured to, when executed by at least one of the one or more processors, manage program execution in accordance with one or more defined policies by:
monitoring performance for a group of one or more computing nodes that execute one or more software programs for a client, the monitored performance providing information about how measured values for one or more capacity utilization metrics change to reflect modifications in an amount of resource usage capacity of the group of computing nodes, the modifications being made based on a first capacity modification policy for the client;
determining a second capacity modification policy to use for future execution of the one or more software programs for the client that is based at least in part on the provided information from the monitored performance, the determined second capacity modification policy being an updated version of the first capacity modification policy and being for use in controlling additional automatic modifications in an amount of resource usage capacity that will be made at future times based on capacity utilization at those future times; and storing the determined second capacity modification policy, to enable later use of the stored determined capacity modification policy to control additional automatic modifications in the amount of resource usage capacity during the future execution of the one or more software programs for the client.

21. The system of claim 20 further comprising one or more computing systems that each includes at least one of the one or more processors and that are configured to provide a program execution service having a plurality of computing nodes configurable to execute programs of users of the program execution service, wherein the one or more computing nodes of the group are a subset of multiple of the plurality of computing nodes, wherein the client is one of the multiple users, and wherein the one or more modules each includes software instructions for execution by the one or more processors.

22. The system of claim 21 wherein the resource usage capacity of the group of computing nodes includes program execution capacity that is managed at least in part on a quantity of computing nodes of the group by the first capacity modification policy.

23. The system of claim 20 wherein executing of the one or more software programs for the client on the group of computing nodes occurs during a first period of time, and wherein the managing of the program execution in accordance with the one or more defined policies further includes, during a second period of time after the first period of time and after the storing of the determined second capacity modification policy:

executing the one or more software programs on at least one computing node on behalf of the client; and using the stored determined second capacity modification policy to control the additional automatic modifications in the amount of resource usage capacity of the at least one computing node that are made during the second period of time.

24. The system of claim 20 wherein the system includes a plurality of hardware resources of one or more types that are available for use in executing software programs of one or more users, and wherein the one or more computing nodes of the group are associated with a subset of the plurality of hardware resources.

25. The system of claim 24 wherein the one or more types of the plurality of hardware resources include at least one of volatile memory, non-volatile data storage, network bandwidth, non-network communication bandwidth, or CPU instruction execution capabilities, and wherein the one or more capacity utilization metrics each corresponds to an amount of use of one of the one or more types of the plurality of hardware resources.

26. The system of claim 20 wherein the one or more modules consist of one or more means for performing the managing of the program execution in accordance with the one or more defined policies.

27. The system of claim 20 wherein the first capacity modification policy includes one or more defined triggers that specify one or more conditions under which one or more indicated changes are to be made in an amount of resource usage capacity being used, and wherein the determined second capacity modification policy includes updates to at least one of the one or more conditions or the one or more indicated changes.

28. The non-transitory computer-readable medium of claim 16 wherein the initial capacity modification policy includes one or more defined triggers that specify one or more conditions under which one or more indicated changes are to be made in an amount of program execution capacity being used, and wherein the determined updated capacity modification policy includes updates to at least one of the one or more conditions or the one or more indicated changes.

29. The method of claim 1 wherein the initial client-specified capacity modification policy includes one or more defined triggers that specify one or more conditions under which one or more indicated changes are to be made in an amount of program execution capacity being used, and wherein the determined updated capacity modification policy includes updates to at least one of the one or more conditions or the one or more indicated changes.

* * * * *